United States Patent
Auer et al.

(10) Patent No.: US 7,377,453 B2
(45) Date of Patent: May 27, 2008

(54) DRY MATERIAL SURFACE APPLICATOR

(75) Inventors: Leslie L. Auer, Broadview, MT (US); Bart A. Erickson, Broadview, MT (US); Mitchell R. Auer, Billings, MT (US)

(73) Assignee: A&E Manufacturing, Inc., Broadview, MT (US)

( * ) Notice: Subject to any disclaimer, the term of this patent is extended or adjusted under 35 U.S.C. 154(b) by 106 days.

(21) Appl. No.: 11/327,581

(22) Filed: Jan. 6, 2006

(65) Prior Publication Data

US 2007/0062425 A1    Mar. 22, 2007

Related U.S. Application Data

(63) Continuation-in-part of application No. 10/966,450, filed on Oct. 15, 2004, now Pat. No. 7,028,919.

(51) Int. Cl.
*B05B 1/20* (2006.01)

(52) U.S. Cl. .................................... 239/168

(58) Field of Classification Search ........ 111/130–133, 111/11–13, 118, 127; 239/159–169, 146, 239/722–754

See application file for complete search history.

(56) References Cited

U.S. PATENT DOCUMENTS

| | | | |
|---|---|---|---|
| 2,657,949 A | 11/1953 | Morrison | |
| 3,447,750 A | 6/1969 | Weston | |
| 4,117,892 A | 10/1978 | Dietrich, Sr. et al. | |
| 4,496,004 A | 1/1985 | Frase et al. | |
| 4,709,857 A | 12/1987 | Wilger | |
| 4,739,930 A | 4/1988 | Pask | |
| 5,029,757 A | 7/1991 | Bourgault et al. | |
| 5,117,579 A | 6/1992 | Tellefson | |
| 5,178,328 A | 1/1993 | Broyhill | |
| 5,673,854 A | 10/1997 | Kinder | |
| 6,408,950 B1 | 6/2002 | Shoup | |
| 6,422,483 B1 | 7/2002 | Yocom et al. | |

*Primary Examiner*—Christopher J. Novosad
(74) *Attorney, Agent, or Firm*—Antoinette M. Tease

(57) ABSTRACT

A dry material surface applicator comprising: a plurality of receptacles for attaching hoses from an air seeder cart; a plurality of towers mounted on a boom; a plurality of smaller distribution tubes emanating from each tower; a plurality of deflector shields mounted to the rear side of the boom; two boom wheels at either end of the boom; a center section comprising a single axle, two center wheels, an inside support bar, and two outside support bars; two swing arms, each of which is pivotally connected to one of the outside support bars of the center section proximate the center wheels; two main arms, each of which is releasably attached to a swing arm on one end and a bracket mounted to the boom on the other end; and a latching mechanism that locks the swing arm in place when the applicator is in a field or highway position.

5 Claims, 20 Drawing Sheets

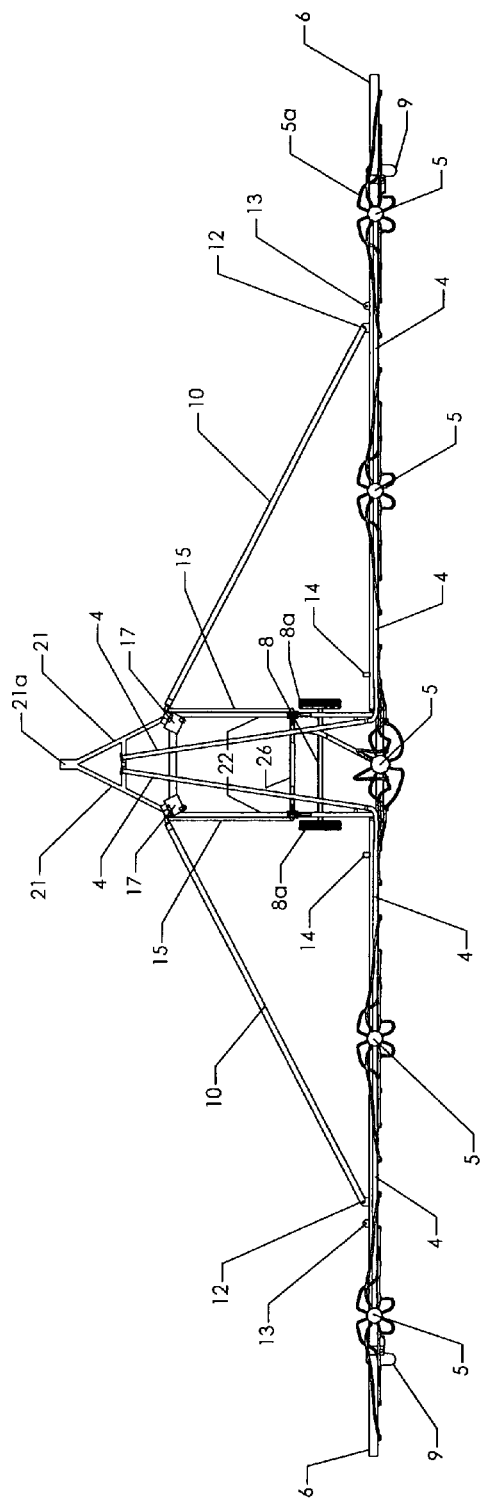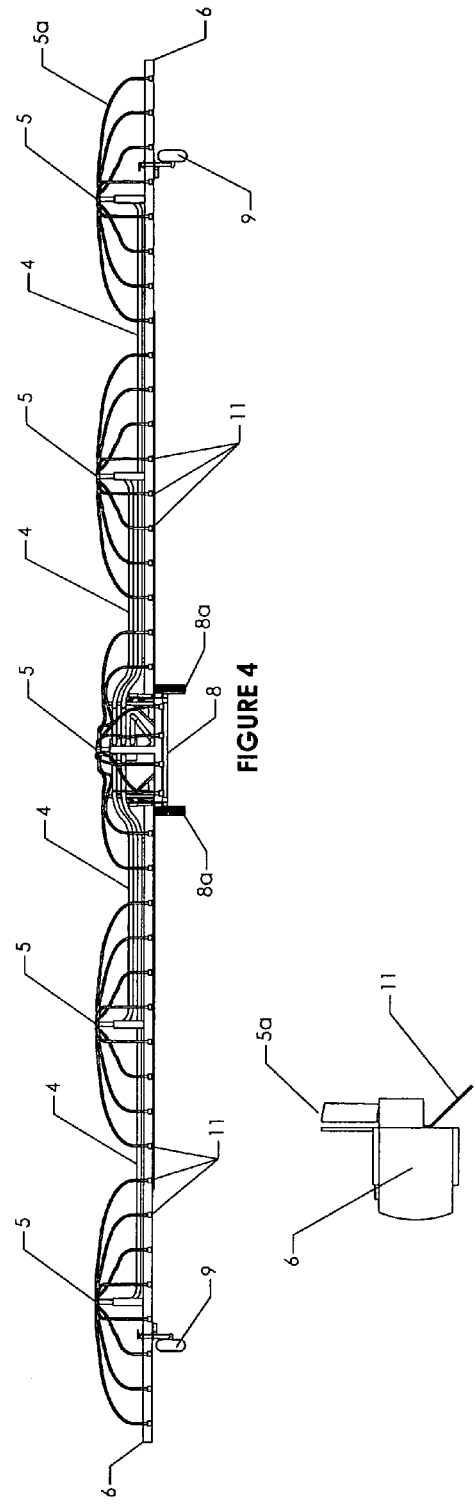

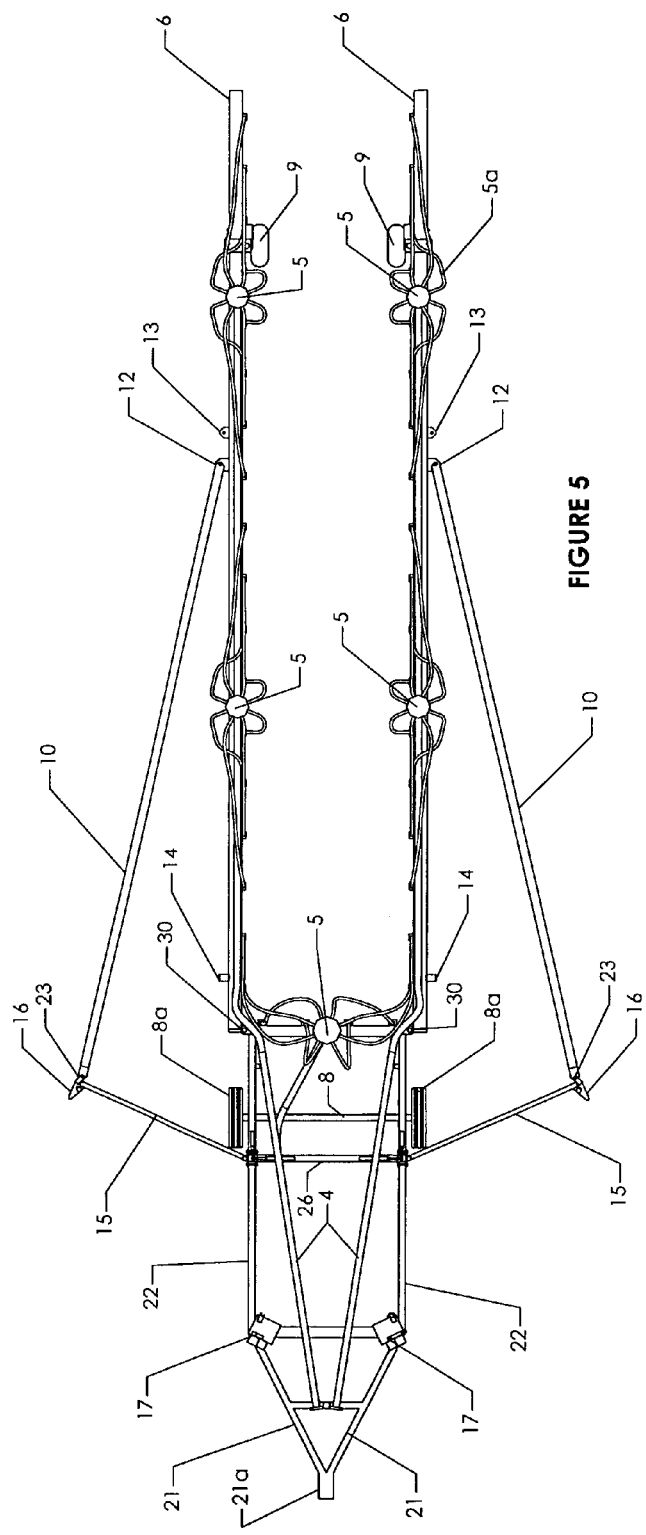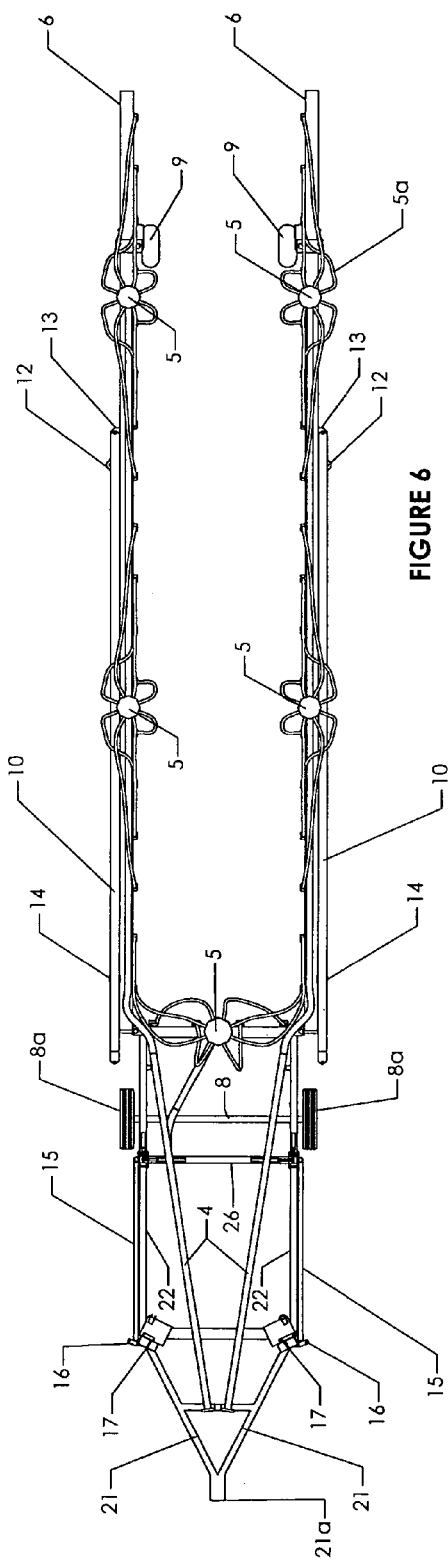
FIGURE 5
FIGURE 6

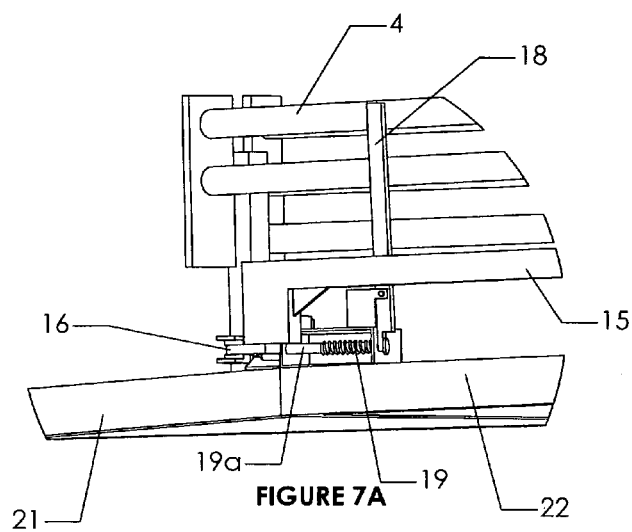
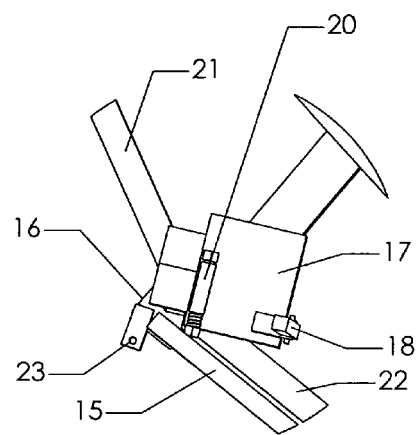
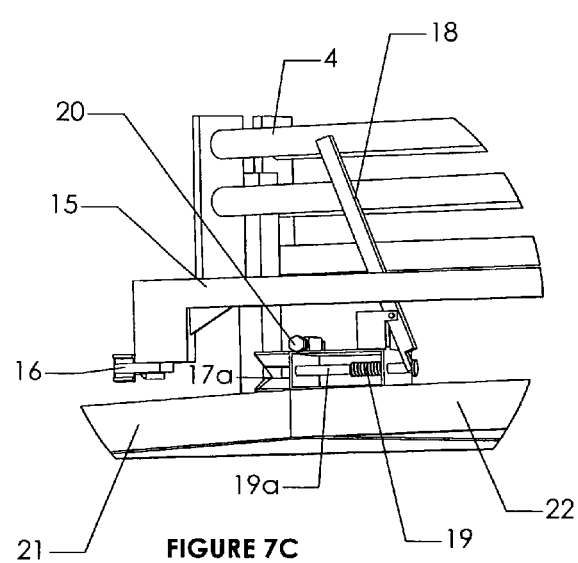
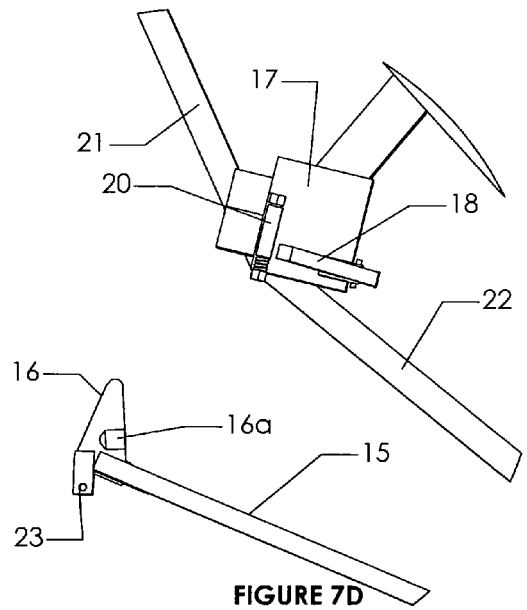
FIGURE 7A
FIGURE 7B
FIGURE 7C
FIGURE 7D

DRY MATERIAL SURFACE APPLICATOR

BACKGROUND OF THE INVENTION

1. Field of the Invention

The present invention relates to the field of agricultural machinery, and more specifically, to a piece of equipment that allows for the distribution of dry material over agricultural fields.

2. Description of the Related Art

Several different versions of a spraying system and/or tool bar have been invented and patented. None of these inventions, however, solves the problem of evenly distributing dry material over the surface of a large area with a piece of equipment that is easily maneuvered and transported. Furthermore, none of these inventions is designed to be used with existing air seeder carts, which are already present on most farms. The discussion below illustrates the evolution of the background art in this field.

In U.S. Pat. No. 2,657,949 (Morrison, 1953), the inventor disclosed an agricultural machine for distributing chemical weed destroyers and other spray materials. This invention is limited in that it contains spray nozzles for the distribution of liquid chemicals. It is also limited in that includes caster wheels, which can contribute to skidding and are also more difficult to maintain than non-caster wheels. Furthermore, with this design, the wheels on the outer ends of the spray boom are not aligned with the center section, which can also contribute to skidding.

In U.S. Pat. No. 3,447,750 (Weston, 1969), the inventor described a spraying boom for mounting on an agricultural tractor or similar self-propelled vehicle. As with the '949 patent, this patent is limited in that it is intended for use with liquid chemicals and not dry materials. In addition, this design encompasses a suspended boom, which is problematic in terms of efficacy and durability. The apparatus mounts on either side of the front of a tractor, so that it is pushed-not pulled-by the tractor.

In U.S. Pat. No. 4,117,892 (Dietrich, Sr. et al., 1978), the inventors provided an agricultural folding tool bar with a rigid cross frame. This invention is limited in that it includes a rigid (or double) cross frame as opposed to a single cross frame. Although it can be used to apply dry material, this device does so by means of a ground-engaging implement. It is intended more for use as a planter rather than as an applicator for dry fertilizer. This particular device does not have any center section, which would contribute to its stability, and it has non-aligned, caster wheels (i.e., the wheels are not aligned with the cross frame but rather sit behind it.

In U.S. Pat. No. 4,496,004 (Frase et al., 1985), the inventors described a collapsible farm implement that has a central support and two toolbars that are hingedly connected to the central support. One significant limitation of this invention is that it relies on hydraulics for its operation. Another limitation is that it is ground-engaging and cannot be used as a broadcasting system for distributing dry material on the surface of a field. This apparatus lacks the simplicity and ease of manufacture of the present invention.

In U.S. Pat. No. 4,709,857 (Wilger, 1987), the inventor disclosed an agricultural field sprayer frame with two laterally extending boom sections. The boom sections fold inward for transportation, but the folding and unfolding of the booms is controlled by hydraulics. As with the '949 and '750 patents discussed above, this invention is intended to be used for the distribution of liquid chemicals and not dry materials. This particular invention has a double hinge in the center of each boom that effectuates a double fold in the boom but that also contributes to the overall weakness of this design. The combination of a double tandem center section with four wheels on the booms increases the risk of skidding.

U.S. Pat. No. 4,739,930 (Pask, 1988) involves an agricultural field sprayer with a main boom center section and wing sections that are hingedly attached to the center section. The wing sections are each comprised of two booms—a main boom and a spray boom. This invention is limited in that it applies only to the application of liquid chemical solutions. The invention is further limited in that it relies on hydraulics for movement of the booms. In addition, the wing sections are offset from direct alignment with the center section (in other words, this patent teaches away from direct alignment of the center section with the booms). The wing sections are supported by caster wheels that can be locked in a non-castering mode for transport.

In U.S. Pat. No. 5,029,757 (Bourgault et al., 1991), the inventors described a sprayer implement comprised of two wing booms that are independently controlled by hydraulic cylinders. This invention is limited in that it applies only to the spraying of liquid chemicals and it relies on hydraulics. It also has caster wheels, which can cause skidding when the tractor takes a sharp turn.

U.S. Pat. No. 5,117,579 (Tellefson, 1992) relates to a method and apparatus for applying fixed nitrogen to plants. The invention comprises a farming implement with a boom on which a series of bell-shaped members are mounted. Inside of each bell-shaped member is an ion emitter. An electrical circuit ion generating mechanism is connected to the ion emitters, and a power source is provided for energizing the electrical circuit. This invention is limited in that it is dependent upon the generation of electricity, and it cannot be used to broadcast dry material over a field surface.

In U.S. Pat. No. 5,178,328 (Broyhill, 1993), the inventor provided a spray boom apparatus that folds up vertically so that it can fit through a doorway. This invention is limited in that it is designed for use with liquid chemicals. In addition, the multiple folding points represent potential weak points in the structure.

In U.S. Pat. No. 5,673,854 (Kinder, 1997), the inventor disclosed a foldable spraying system with a closed boom (called a "bottomless box" in the patent) and four caster wheels. This invention is limited in that it applies only to the spraying of liquid chemicals.

U.S. Pat. No. 6,408,950 (Shoup, 2002) involves a foldable implement frame and hitch designed to carry an air-injection planter for corn and other hard kernel grains, rotary hoes, "duck-foot" field cultivators, and similar ground-engaging implements. The apparatus has two wing frames that are moved by a hydraulic motor. Motors are also used to move the field wheels and the dedicated transport wheels from ground-engaging, transport positions to stored positions. This invention is limited in that it applies primarily to ground-engaging implements and relies on hydraulics for its operation.

Lastly, U.S. Pat. No. 6,422,483 (Yocom et al., 2002) provides another spray boom apparatus. This device mounts on the front of the tractor and folds up both horizontally and vertically. This invention is limited in that it cannot be used to broadcast dry material over a field, and the multiple folding points contribute to the weakness of the overall structure.

BRIEF SUMMARY OF THE INVENTION

The present invention is a dry material surface applicator comprising: a plurality of receptacles for attaching hoses from an air seeder cart; a plurality of towers that are mounted on a boom; a plurality of smaller distribution tubes emanating from each tower; a plurality of deflector shields mounted to the rear side of the boom; two boom wheels at either end of the boom; a center section comprising a single axle, two center wheels, an inside support bar, and two outside support bars; two swing arms, each of which is pivotally connected to one of the outside support bars of the center section proximate the center wheels; two main arms, each of which is releasably attached to a swing arm on one end and a bracket mounted to the boom on the other end; and a latching mechanism that locks the swing arm in place when the dry material surface applicator is in a field or highway position.

The dry material surface applicator of the present invention can be adapted to work with a variety of different air seeder systems and folds up easily for transport on highways or roads. In the preferred embodiment, the boom is pivotally connected to the center section so that it can be folded back when the dry material surface applicator is in a trail or highway position. Also in the preferred embodiment, the number of receptacles equals the number of air seeder hoses, the number of towers equals the number of large distribution tubes, and the smaller distribution tubes deliver dry material to the deflector shields, which evenly distribute the dry material over the surface of a field.

In the preferred embodiment, the center wheels are solid mount, stationary wheels, and the boom wheels are solid mount, non-caster wheels with a quarter-turn plate. The quarter-turn plate allows the boom wheels to be rotated ninety degrees. The position of the boom wheels, swing arms and main arms is dependent upon whether the applicator is in field, trail or highway position. Two saddles are mounted on either side of the boom for receiving the main arms when the dry material surface applicator is in highway position. When the applicator is in field or highway position, the swing arms are locked into place by a latching mechanism on the front end of the outside support bar of the center section.

The latching mechanism comprises a latch arm, a first spring, a second spring, and a rod. The latch arm controls the first spring, and the first spring controls the rod. The swing arm comprises a swing arm extension with a notch into which the rod fits when the swing arm is in a locked position. The second spring pushes the swing arm away from the latching mechanism when the first spring is compressed and the rod is retracted from the notch in the swing arm extension.

The present invention further comprises two adjustment arms. The first adjustment arm stabilizes the inside support bar, and the second adjustment arm raises or lowers the swing arm so that it hits the latching mechanism at the correct angle.

In an alternate embodiment, hydraulic cylinders are used to move the boom wheels. In this embodiment, the present invention comprises two rear hydraulic cylinders that move the boom wheels so that they are either perpendicular to or parallel with the boom and a front hydraulic cylinder that extends and retracts the rod of the latching mechanism. When the rod is extended, the swing arm is locked in place in a field position, and when the rod is retracted, the swing arm is released from the latching mechanism. Preferably, when the front hydraulic cylinder is retracted, the rear hydraulic cylinders are extended, and when the front hydraulic cylinder is extended, the rear hydraulic cylinders are retracted. When the rear hydraulic cylinders are extended, the boom wheels are parallel with boom, and when the rear hydraulic cylinders are retracted, the boom wheels are perpendicular to the boom.

BRIEF DESCRIPTION OF THE DRAWINGS

FIG. 1 is a perspective view of the present invention attached to an air seeder cart and tractor.

FIG. 2 is a perspective view of the present invention in field position.

FIG. 3 is a top view of the present invention in field position.

FIG. 4 is a rear view of the present invention in field position.

FIG. 4A is a side view of a deflector shield.

FIG. 5 is a top view of the present invention in trail position.

FIG. 6 is a top view of the present invention in highway position.

FIG. 7A is a partial perspective view of the latching mechanism of the present invention with the swing arm in a closed or locked position.

FIG. 7B is a top view of the latching mechanism of the present invention with the swing arm in a closed or locked position.

FIG. 7C is a partial perspective view of the latching mechanism of the present invention with the swing arm in an open or unlocked position.

FIG. 7D is a top view of the latching mechanism of the present invention with the swing arm in open or unlocked position.

FIG. 8 is a partial perspective view of the two adjustment arms of the present invention.

FIG. 9A is a partial perspective view of the boom wheel in field position shown from the rear/top of the boom.

FIG. 9B is a partial perspective view of the boom wheel in trail or highway position shown from the inside/top of the boom.

FIG. 9C is a partial perspective view of the boom wheel in field position shown from the front/bottom of the boom.

FIG. 9D is a partial perspective view of the boom wheel in trail or highway position shown from the outside/bottom of the boom.

FIG. 10 is a perspective view of the front hydraulic cylinder in an extended position.

FIG. 11 is a detail view of the position of the rod inside the latching mechanism when the front hydraulic cylinder is in an extended position.

FIG. 12 is a perspective view of the front hydraulic cylinder 32 in a retracted position.

FIG. 13 is a detail view of the position of the rod inside the latching mechanism when the front hydraulic cylinder is in a retracted position.

FIG. 14 is a top view of the front hydraulic cylinder.

FIG. 15 is a first side view of one of the two rear hydraulic cylinders.

FIG. 16 is a perspective view of the same rear hydraulic cylinder shown in FIG. 15.

FIG. 17 is a side view of one of the boom wheels with the rear hydraulic cylinder extended.

FIG. 18 is a perspective view of the same boom wheel shown in FIG. 17.

FIG. 19 is a second side view of one of the two rear hydraulic cylinders.

FIG. 20 is a perspective view of the same rear hydraulic cylinder shown in FIG. 19.

REFERENCE NUMBERS

Figure 1:
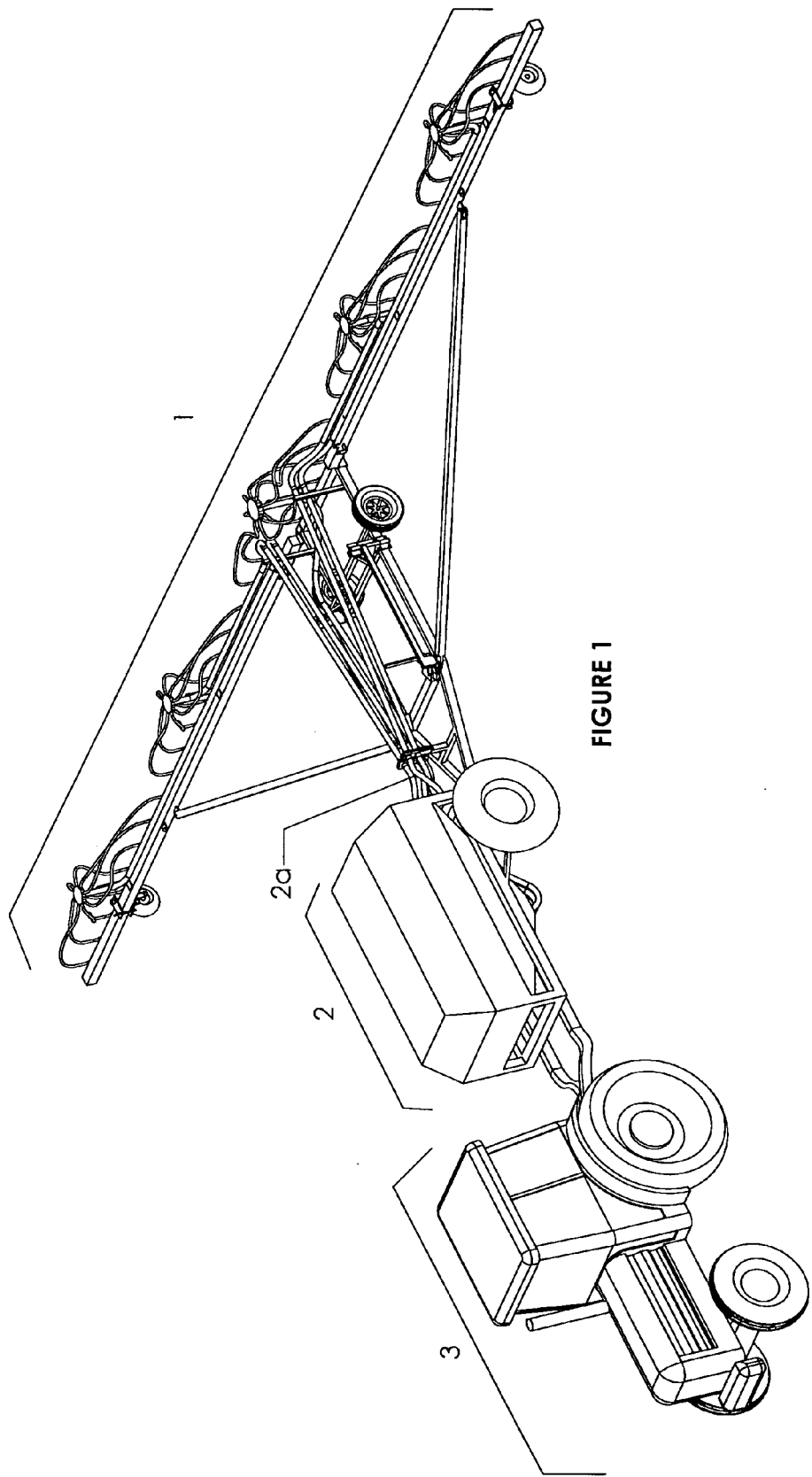

1 Dry material applicator
2 Air seeder cart
2a Air seeder hoses
3 Tractor
4 Large distribution tube
5 Tower
5a Smaller distribution tube
6 Boom
7 Receptacle
8 Axle
8a Center wheel
9 Boom wheel
10 Main arm
11 Deflector shield
12 Field/trail bracket
13 Highway bracket
14 Saddle
15 Swing arm
16 Swing arm extension
16a Notch in swing arm extension
17 Latching mechanism
17a Gap
18 Latch arm
19 First spring
19a Rod
20 Second spring
21 Front support bar
21a Hitch attachment point
22 Outside support bar
23 Main arm attachment point
24 First adjustment arm
24a Nut (for first adjustment arm)
24b Plate (for first adjustment arm)
25 Second adjustment arm
25a Nut (for second adjustment arm)
25b Plate (for second adjustment arm)
26 Inside support bar
27 Top plate
27a Bottom plate
27b Quarter turn plate
27c Receiver in quarter turn plate
28 Lever
29 Leg
30 Pivot point
31 Center section housing
32 Front hydraulic cylinder
33 Cable
34 Hydraulic hose
35 Rear hydraulic cylinder
36 Rotating member
37 Rear pivot point
38 Rear plate
39 Bracket

DETAILED DESCRIPTION OF INVENTION

Unlike any of the prior art, the present invention is an attachment to an air seeder cart and tractor that enables farmers to evenly broadcast dry material over the surface of a field. The present invention is easy to use and needs no hydraulics to operate (although hydraulics are used in an alternate embodiment). The manual boom latches and overall simplicity of design of the present invention make it superior to other, more complicated types of machinery. The deflector shields are unique to the present invention and allow the dry material to be scattered evenly across the length of the boom. The fact that the present invention uses solid mount, non-caster wheels further distinguishes it from prior art. Additional advantages over the prior art are discussed below in specific reference to the figures.

FIG. 1 is a perspective view of the present invention attached to an air seeder cart and tractor. The present invention is a dry material applicator 1 that attaches directly to the rear of an air seeder cart 2 through a conventional hitch mechanism (not shown). The air seeder hoses 2a are connected to a set of two receptacles (shown in FIG. 2) in the front of the dry material applicator 1. The present invention can be configured to work with a wide variety of air seeder systems, such as those manufactured and sold by Flexi-Coil, John Deere, Bourgault and Morris Industries. The present invention is not limited to any particular type of dry material and can be used to distribute dry fertilizer, grass seed, alfalfa seed, etc. In FIG. 1, the present invention is shown in field position.

Figure 2:
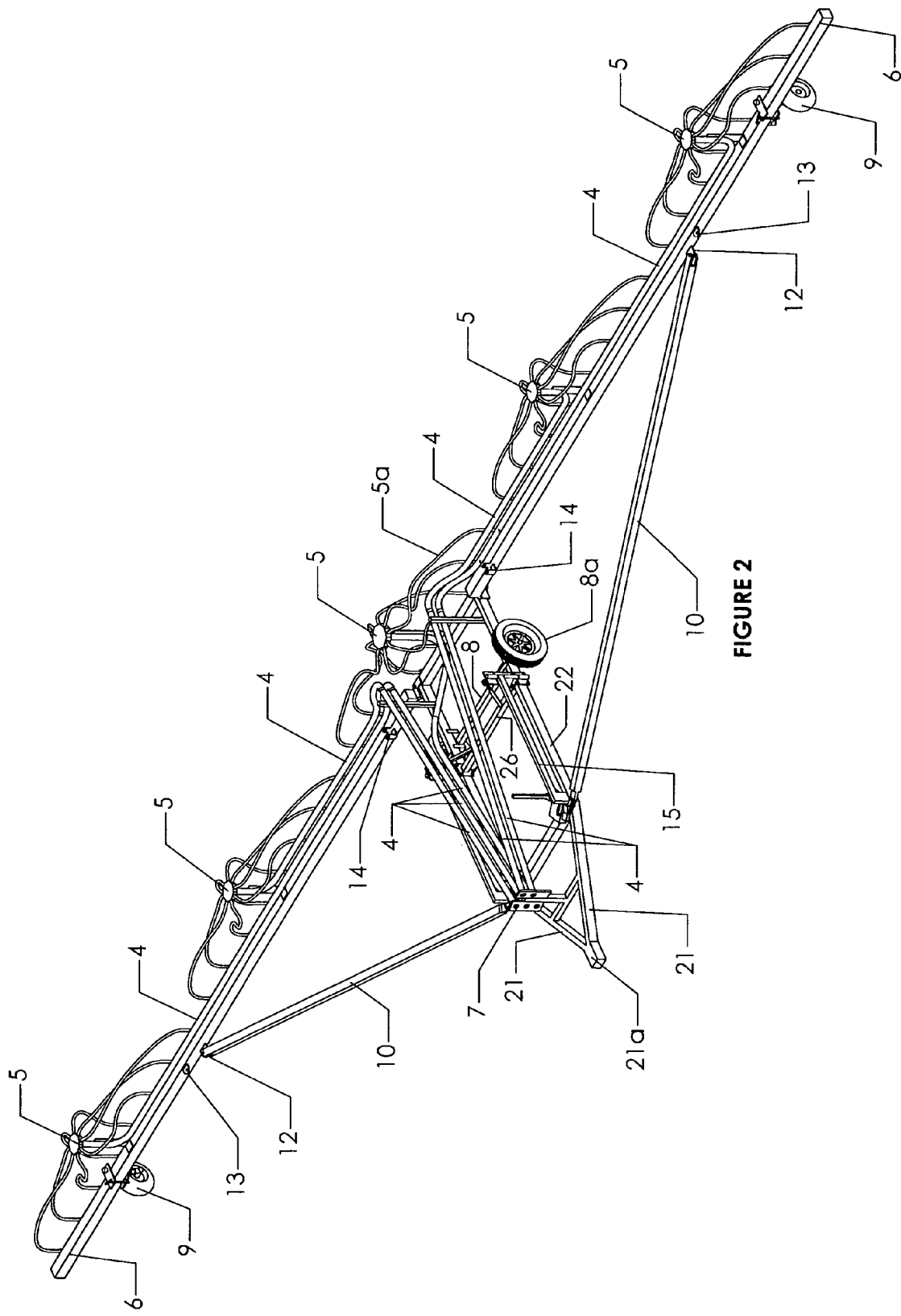

FIG. 2 is a perspective view of the present invention in field position when it is not attached to an air seeder cart. This figure shows the two sets of receptacles 7 to which the air seeder hoses (shown in FIG. 1) are attached. A set of large (or primary) distribution tubes 4 extends from the rear of each set of receptacles 7. One set of large distribution tubes 4 runs down the right-hand side of the boom 6, and the other set runs down the left-hand side of the boom 6. This figure shows a total of five large distribution tubes, but the present invention can be adapted to work with any number of large distribution tubes. The number of large distribution tubes has to correspond to the number of air seeder hoses; therefore, the number of large distribution tubes will vary depending on the type of air seeder system used.

Each large distribution tube 4 terminates in a tower 5 that is mounted on top of the boom 6. Each tower further distributes the dry material into a number of smaller (or secondary) distribution tubes 5a. Although each tower in this figure is shown with five smaller distribution tubes 5a, the present invention is not limited to any particular number of smaller distribution tubes. The smaller distribution tubes 5a terminate in deflector shields (shown in FIG. 4), which are on the rear side of the boom 6.

The present invention comprises four wheels. The center wheels 8a are at either end of a single axle 8 in the center section. The boom wheels 9 are located at either end of the boom 6. The center wheels 8a are solid mount, stationary wheels. The boom wheels 9 are solid mount, non-caster wheels that can be locked into one of two positions (see FIGS. 9A-9D). The center section also comprises two front support bars 21 that come together to form the attachment point 21a to which the air seeder cart is hitched. Two outside support bars 22 provide further stability to the center section. A swing arm 15 is pivotally attached to each outside support bar 22. The pivot point for each swing arm 15 is proximate to the center wheel 8a.

The present invention further comprises two main arms 10. One end of each main arm 10 is releasably attached to the end of the swing arm 15 that is farthest from the center wheel 8. The other end of each main arm 10 is releasably attached to one of two brackets 12, 13 located on the boom 6. As shown in FIG. 2, the present invention is in field position; therefore, the main arms 10 are releasably attached to the field/trail brackets 12 on the boom 6. FIG. 6 illustrates the present invention in highway position, in which the main arm 10 is releasably attached to the highway bracket 13 instead of the field/track bracket 12.

FIG. 3 is a top view of the present invention in field position. This figure shows the hitch attachment point 21a, front support bars 21, outside support bars 22, single axle 8 and center wheels 8a of the center section. An inside support bar 26 runs through the middle of the center section and is discussed further in connection with FIG. 8. This figure also shows the swing arms 15, the main arms 10, the field/trail brackets 12, and the highway brackets 13 on the boom 6. It shows the large distribution tubes 4, the towers 5, the smaller distribution tubes 5a, and the boom wheels 9. This figure also shows the saddles 14 into which the main arms 10 are placed when the present invention is in highway position (see FIG. 6). This figure provides a top view of the latching mechanism 17, which is depicted in greater detail in FIGS. 7A-7D.

FIG. 4 is a rear view of the present invention in field position. In addition to the large distribution tubes 4, towers 5, smaller distribution tubes 5a, boom 6, single axle 8, and boom wheels 9, all of which have been discussed previously, this figure shows the deflector shields 11, which protrude downward and slightly rearward from the boom 6 and which cause the dry material to be distributed evenly across the length of the boom 6. FIG. 4A is a side view of a deflector shield 11, showing the angle of the deflector shield 11 in relation to the boom 6. As can be seen in FIG. 4, the consistent height of the boom 6 provides for even distribution of the dry material, and the relative closeness of the boom to the ground as compared to sprayers and similar types of machinery allows farmers to broadcast the material even during windy conditions.

FIG. 5 is a top view of the present invention in trail position. A trail position would typically be used when moving from one position to another in the field and when not broadcasting dry material. To go from field position (shown in FIG. 3) to trail position (shown in FIG. 5), the swing arms 15 are released from the latching mechanism 17, the boom wheels 6 are rotated by ninety degrees (see FIGS. 9A-9D), and the boom 6 is folded back behind the center section. Two pivot points 30 on either side of the center tower 5 allow the right and left sides of the boom to be folded back. In this position, the swing arms 15 are extended away from the outside support bars 22 of the center section, and the swing arm extension 16 is no longer held in place by the latching mechanism 17.

FIG. 6 is a top view of the present invention in highway position. As shown in this figure, the present invention has a narrower profile in the highway position than in the trail position shown in FIG. 5. In highway position, the present invention can be towed at normal highway speeds. In order to go from trail to highway position, the front end of each main arm 10 is released from the swing arm 15 and placed in the saddle 14 alongside the boom 6. The other end of the main arm 10 is removed from the field/trail bracket 12 and secured to the highway bracket 13 on the boom 6. The swing arms 15 are swung forward and locked into place by the latching mechanism 17. The latching mechanism is depicted in greater detail in FIGS. 7A-7D.

FIG. 7A is a partial perspective view of the latching mechanism of the present invention with the swing arm in a closed or locked position. As shown in this figure, the latching mechanism 17 comprises a latch arm 18, which moves a first spring 19. When compressed, the first spring 19 retracts a rod 19a that fits into a notch 16a (see FIG. 7D) in the swing arm extension 16, thereby releasing the swing arm 15 from the latching mechanism 17. When the first spring 19 is in a relaxed state (i.e., not compressed by the latch arm), the rod 19a fits into the notch 16a in the swing arm extension 16 and holds the swing arm 15 in place.

FIG. 7B is a top view of the latching mechanism of the present invention with the swing arm in a closed or locked position. This figure shows a second spring 20, which serves to push the swing arm 15 away from the latching mechanism 17 when the first spring 19 is compressed and the rod 19a is retracted from the notch 16a in the swing arm extension 16. This figure also shows the main arm attachment point 23, to which the main arm 10 is attached in the field and trail positions.

FIG. 7C is a partial perspective view of the latching mechanism of the present invention with the swing arm in an open or unlocked position. In addition to the features shown in FIGS. 7A and 7B, this figure shows the gap 17a into which the swing arm extension 16 fits when the swing arm 15 is in a locked position.

FIG. 7D is a top view of the latching mechanism of the present invention with the swing arm in open or unlocked position. This figure shows the notch 16a in the swing arm extension 16 of the swing arm 15.

Figure 8:
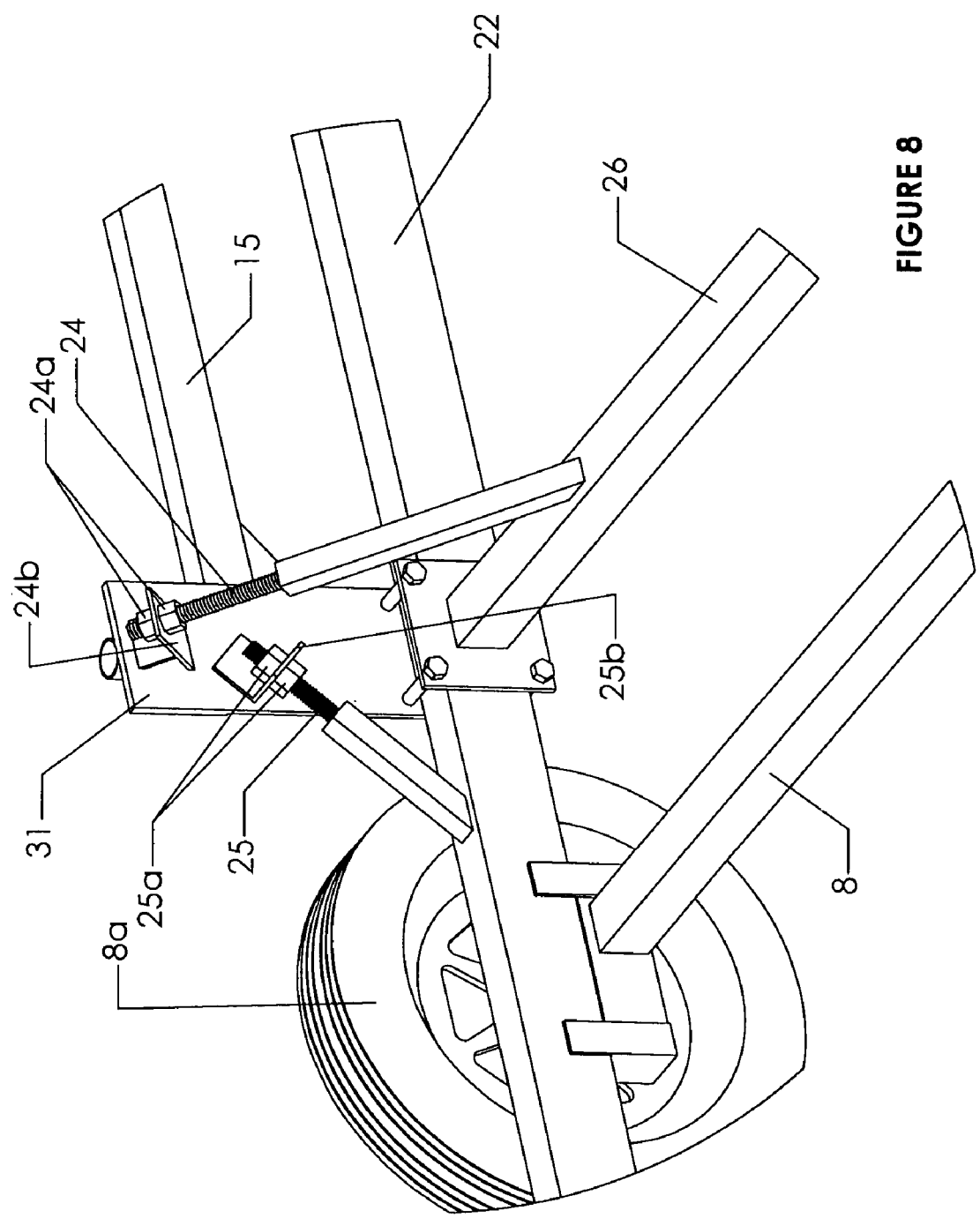

FIG. 8 is a partial perspective view of the two adjustment arms of the present invention. On either side of the inside support bar 26 are two adjustment arms 24, 25. Both adjustment arms are threaded, which allows them to be tightened or loosened through the use of two threaded nuts 24a, 25a on either side of a plate 24b, 25b that is attached to the center section housing 31. The purpose of the first adjustment arm 24 is to stabilize the center section housing 31, to which the swing arm is pivotally attached. The purpose of the second adjustment arm 25 is to raise or lower the swing arm 15 so that it hits the latching mechanism 17 at the correct angle.

Figure 9A:
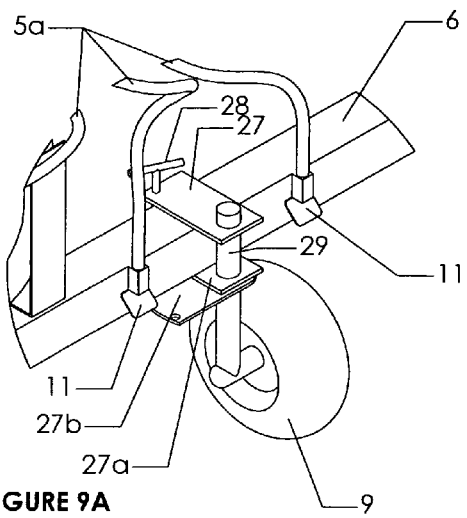

FIG. 9A is a partial perspective view of the boom wheel in field position shown from the rear/top of the boom. As shown in this figure, the boom wheel 9 is perpendicular to the boom 6 when in field position.

Figure 9C:
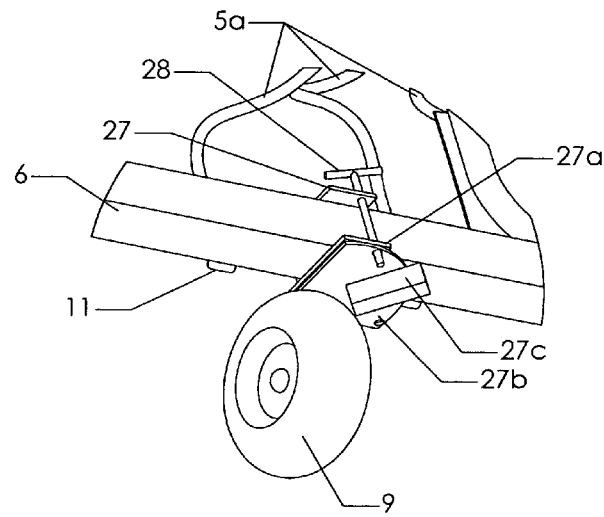
Figure 9B:
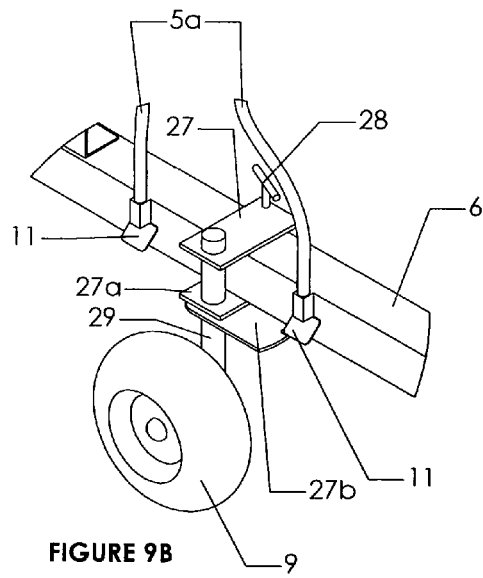

FIG. 9B is a partial perspective view of the boom wheel in trail or highway position shown from the inside/top of the boom. As shown in this figure, the boom wheel 9 is parallel with the boom 6 when in trail or highway position.

Figure 9D:
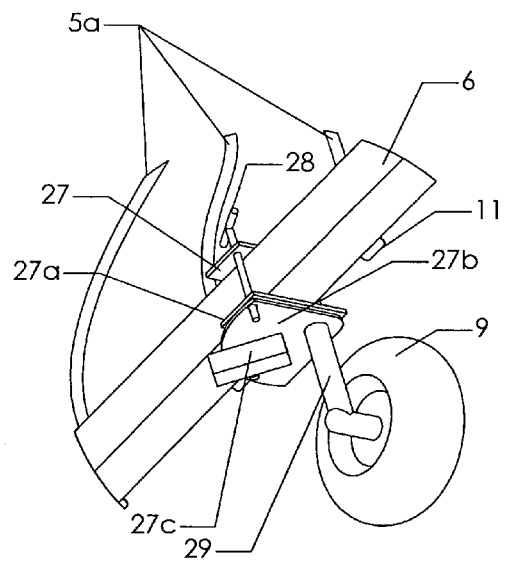

FIGS. 9C is a partial perspective view of the boom wheel in field position shown from the front/bottom of the boom. FIG. 9D is a partial perspective view of the boom wheel in trail or highway position shown from the outside/bottom of the boom. Each boom wheel 9 is connected to a top and bottom plate 27, 27a by a leg 29. A quarter turn plate 27b lies directly beneath the bottom plate 27a. To move the wheel from field position to trail or highway position, the lever 28 is lifted, a bar (not shown) is inserted into the receiver 27c on the bottom of the quarter turn plate, and the quarter turn plate is manually moved either right or left, depending upon the position of the wheel. When moved, the quarter turn plate 27b causes the leg 29 to rotate in the top and bottom plates 27, 27a. The lever 28 is then reinserted into a hole in the quarter turn plate, which locks the wheel in place. The boom wheels 9 are interchangeable in that the same wheel can be placed on either the right- or left-hand side of the boom 6, which is not the case with caster wheels.

In an alternate embodiment, hydraulic cylinders can be used in lieu of the quarter turn plates 27b to move the boom wheels 9. This embodiment is shown in FIGS. 10-22. FIG.

10 is a perspective view of the front hydraulic cylinder 32 in an extended position. When the cylinder is extended, as shown in this figure, the rod 19a extends into the gap 17a in the latching mechanism 17, thereby locking the swing arm extension 16 into place. In this figure, the swing arm extension 16 is shown off to the side for clarity purposes, but in operation, the swing arm 15 would be swung forward, and the part of the rod 19a that extends into the gap 17a in the latching mechanism 17 would fit inside the notch 16a in the swing arm extension 16. Thus, when the front hydraulic cylinder is extended, the swing arms are in a field position, as shown in FIG. 3.

Figure 10:
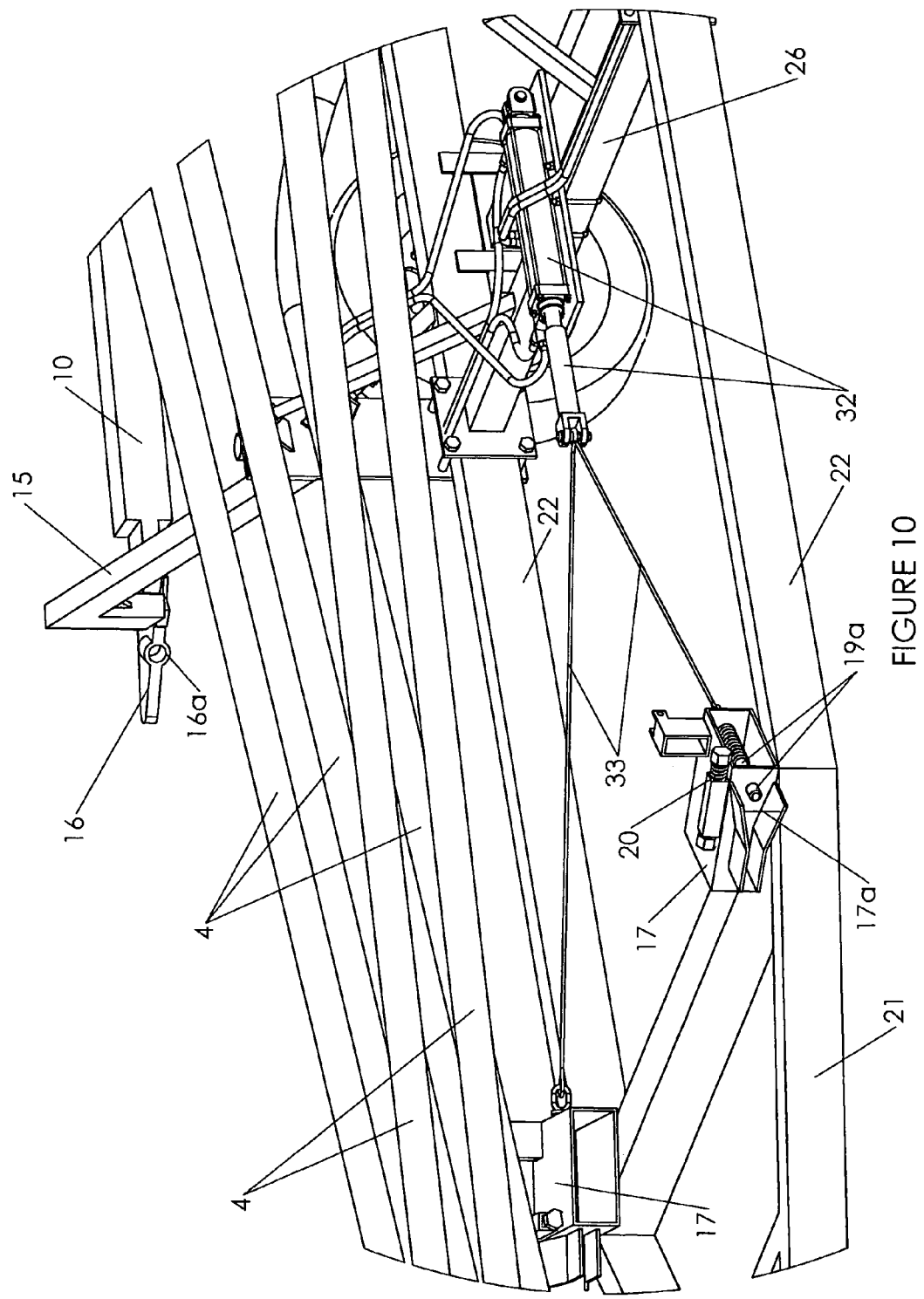
Figure 11:
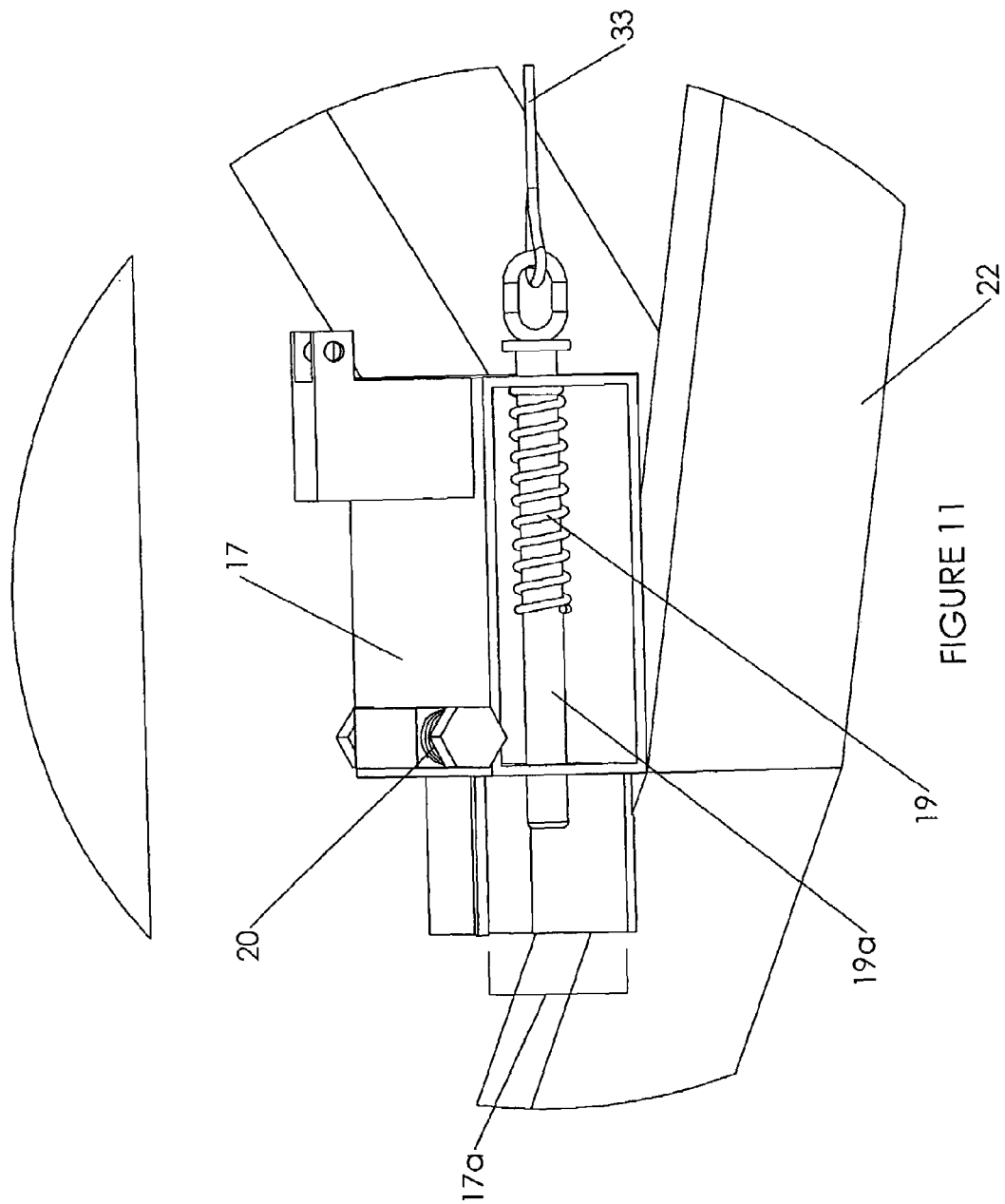

FIG. 11 is a detail view of the position of the rod 19a inside the latching mechanism 17 when the front hydraulic cylinder 32 is in an extended position, as shown in FIG. 10. If FIG. 11 is compared to FIG. 7C, it will be apparent that the latch arm 18 has been removed. In this embodiment, the rod 19a is moved by the front hydraulic cylinder 32 instead of the latch arm 18.

Figure 12:
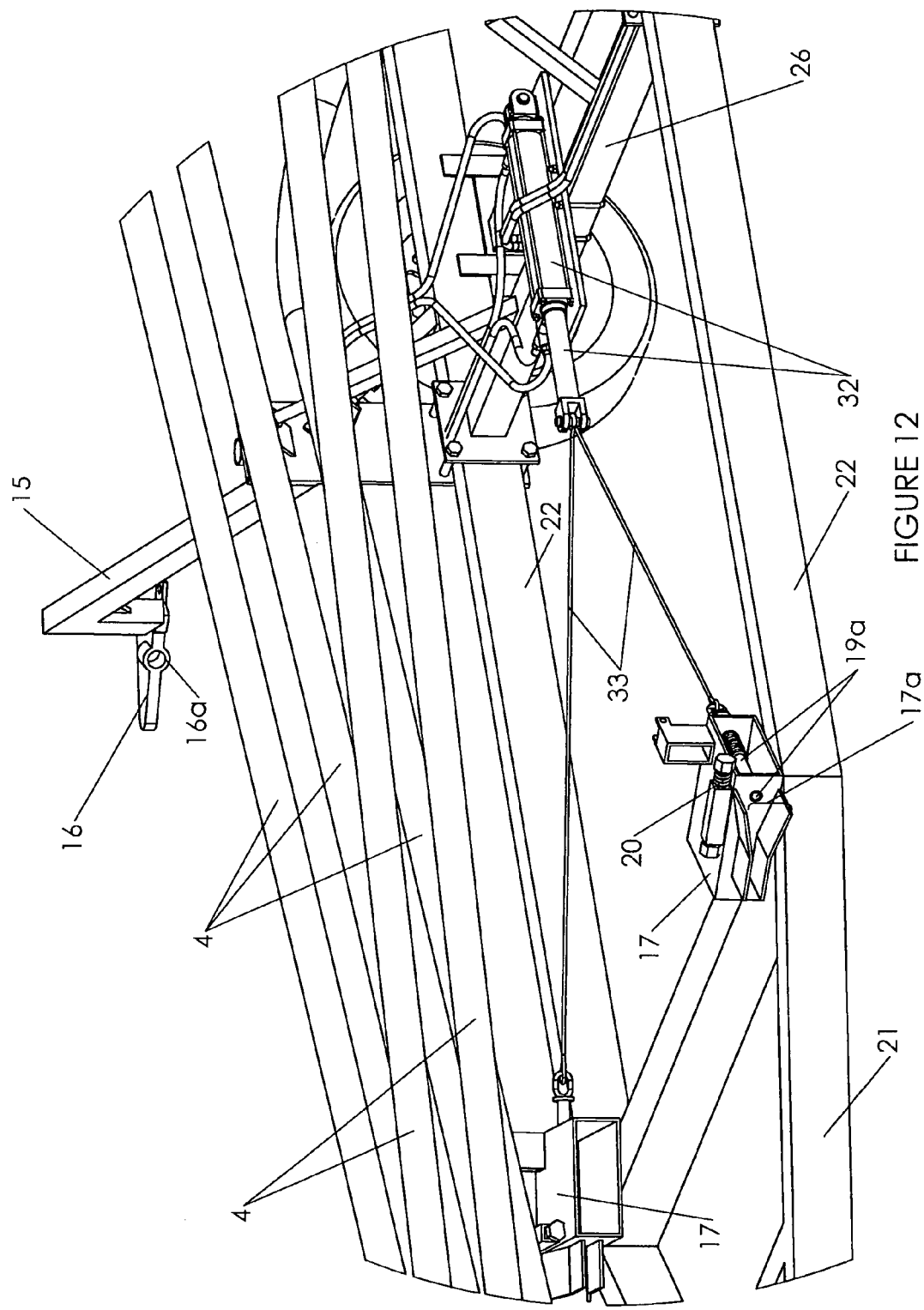
Figure 13:
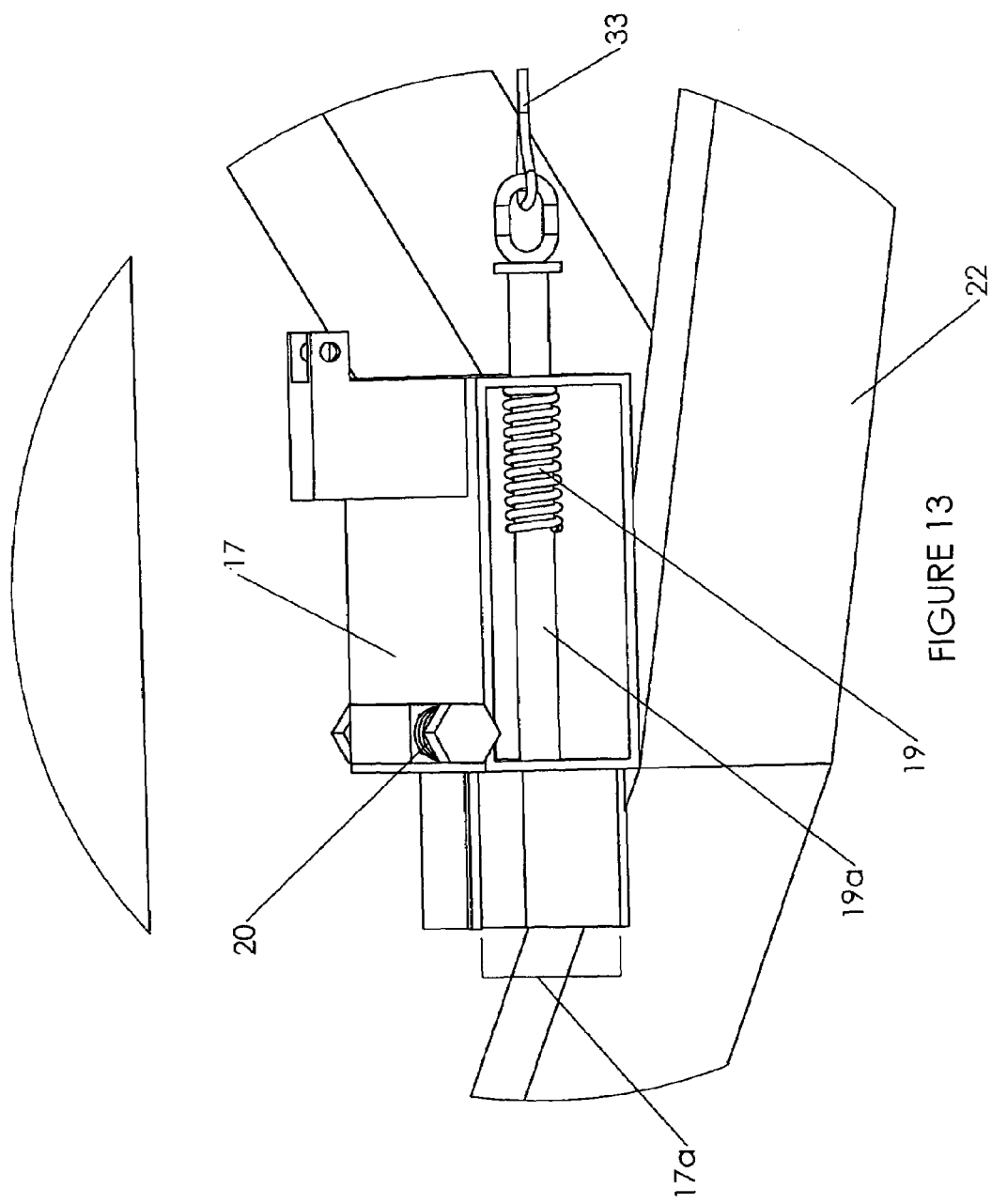

FIG. 12 is a perspective view of the front hydraulic cylinder 32 in a retracted position. In this position, the rod 19a is retracted, the swing arm extension 16 is released, and the swing arm 15 is pushed backward by the second spring 20. As the vehicle moves forward, the swing arms 15 and main arms 10 move into the trail position shown in FIG. 5. FIG. 13 is a detail view of the position of the rod 19a inside the latching mechanism 17 when the front hydraulic cylinder 32 is in a retracted position, as shown in FIG. 12.

Figure 14:
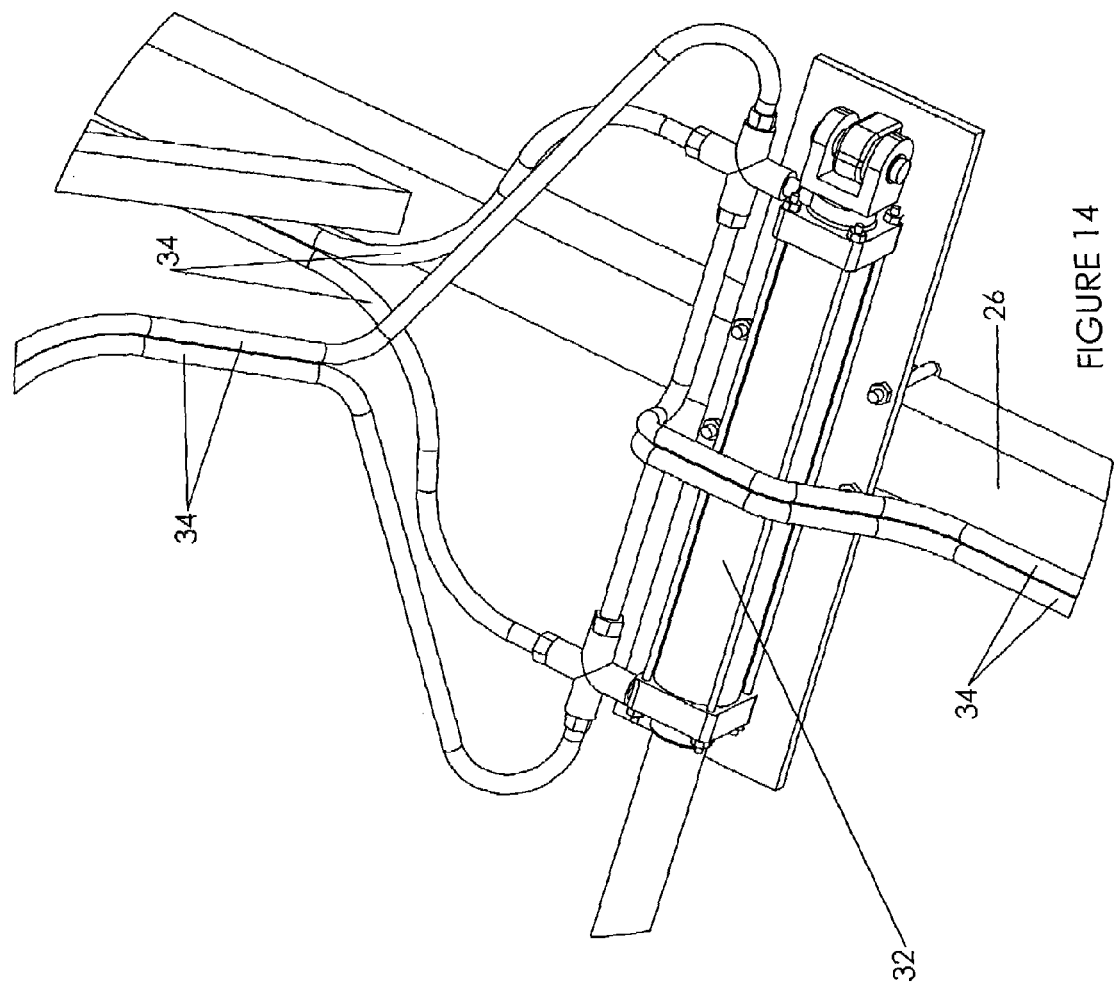

FIG. 14 is a top view of the front hydraulic cylinder 32. This figure shows the hydraulic hoses 34 that connect the front hydraulic cylinder 32 to the control panel in the cab of the tractor 3 (not shown) and to the rear hydraulic cylinders (see FIGS. 15-22) that move the boom wheels 9 (not shown).

Figure 15:
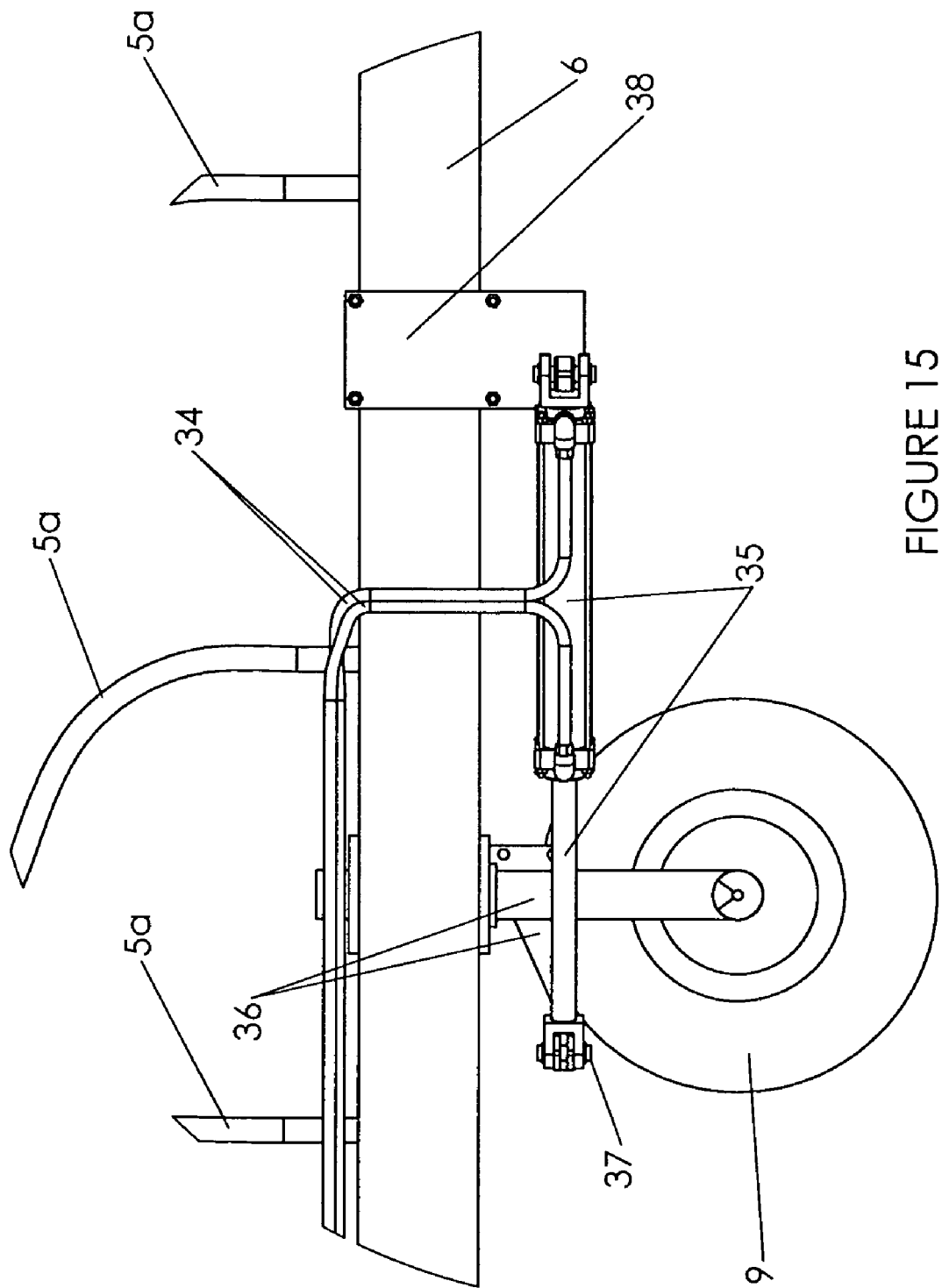

FIG. 15 is a first side view of one of the two rear hydraulic cylinders 35. The rear hydraulic cylinder 35 is connected to the boom 6 by a rear plate 38. The rear hydraulic cylinders 35 move the boom wheels 9 so that they are either perpendicular or parallel with the boom 6. When the front hydraulic cylinder 32 is retracted, the rear hydraulic cylinders 35 are also extended, as shown in FIG. 15. With the rear hydraulic cylinder 35 extended, the boom wheel 9 is parallel with the boom 6. The extension of the rear hydraulic cylinder 35 pushes a rotating member 36 toward the opposite side of the boom 6, which causes the boom wheel 9 to turn in a clockwise direction (from the perspective of the top view shown in FIG. 5).

In the embodiment in which the boom wheels 9 are turned by the quarter turn plate 27b, the rotating member 36 is not present. In the embodiment in which hydraulics are used, the top plate 27, bottom plate 27a, quarter turn plate 27b, receiver 27c, lever 28 and leg 29 shown in FIGS. 9A-9D are missing, and the rotating member 36 and rear hydraulic cylinder 35 are added.

Figure 16:
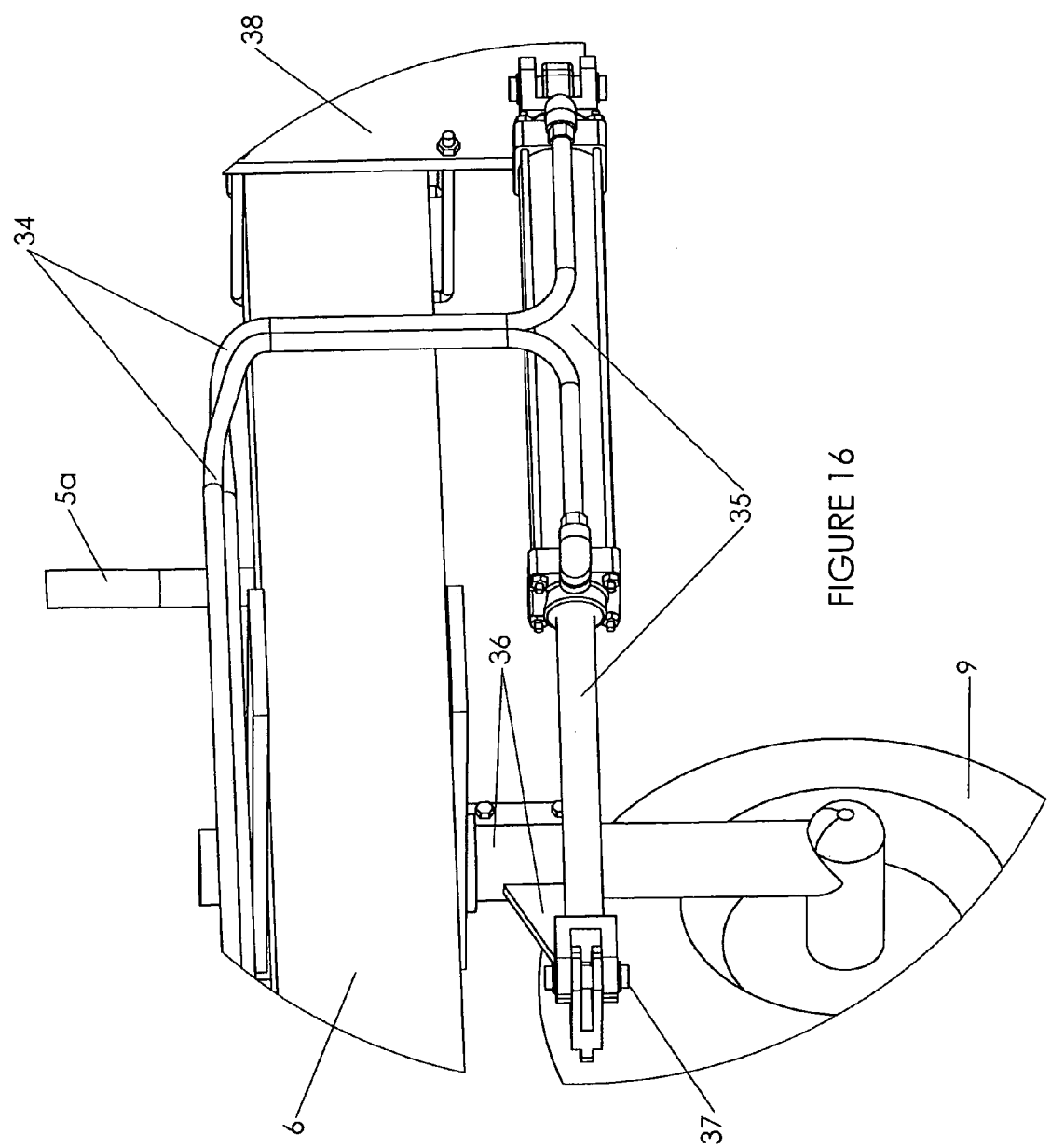

FIG. 16 is a perspective view of the same rear hydraulic cylinder 35 shown in FIG. 15. This figure provides a better view of the rotating member 36 that causes the wheel to turn when the rear hydraulic cylinder 35 is extended or retracted. The rotating member 36 is connected to the rear hydraulic cylinder 35 by a rear pivot point 37.

Figure 17:
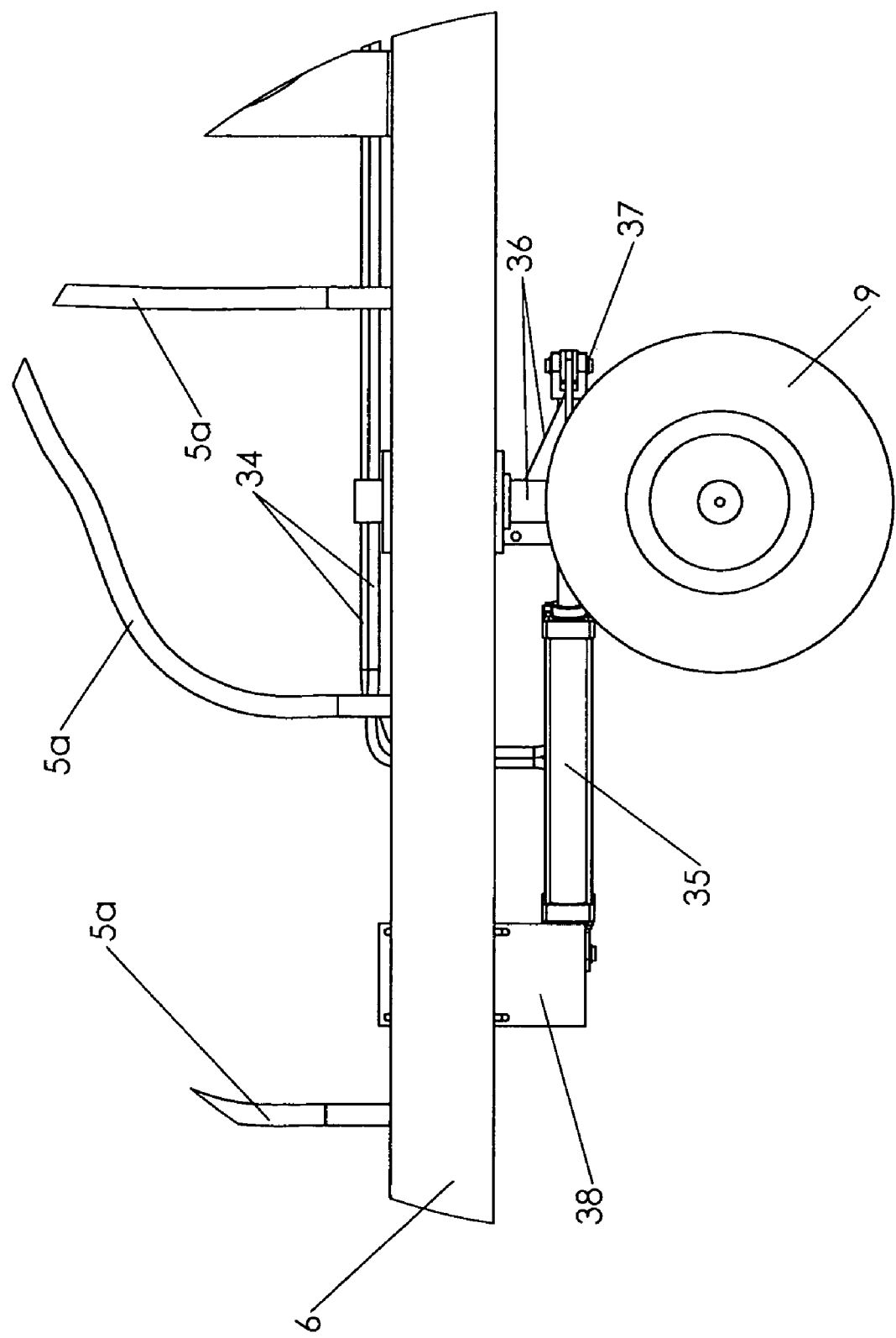

FIG. 17 is a side view of one of the boom wheels 9 with the rear hydraulic cylinder 35 extended. In this figure, the rear hydraulic cylinder 35 and boom wheel 9 are in the same position as in FIG. 15, except that the view is from the opposite side of the boom 6.

Figure 18:
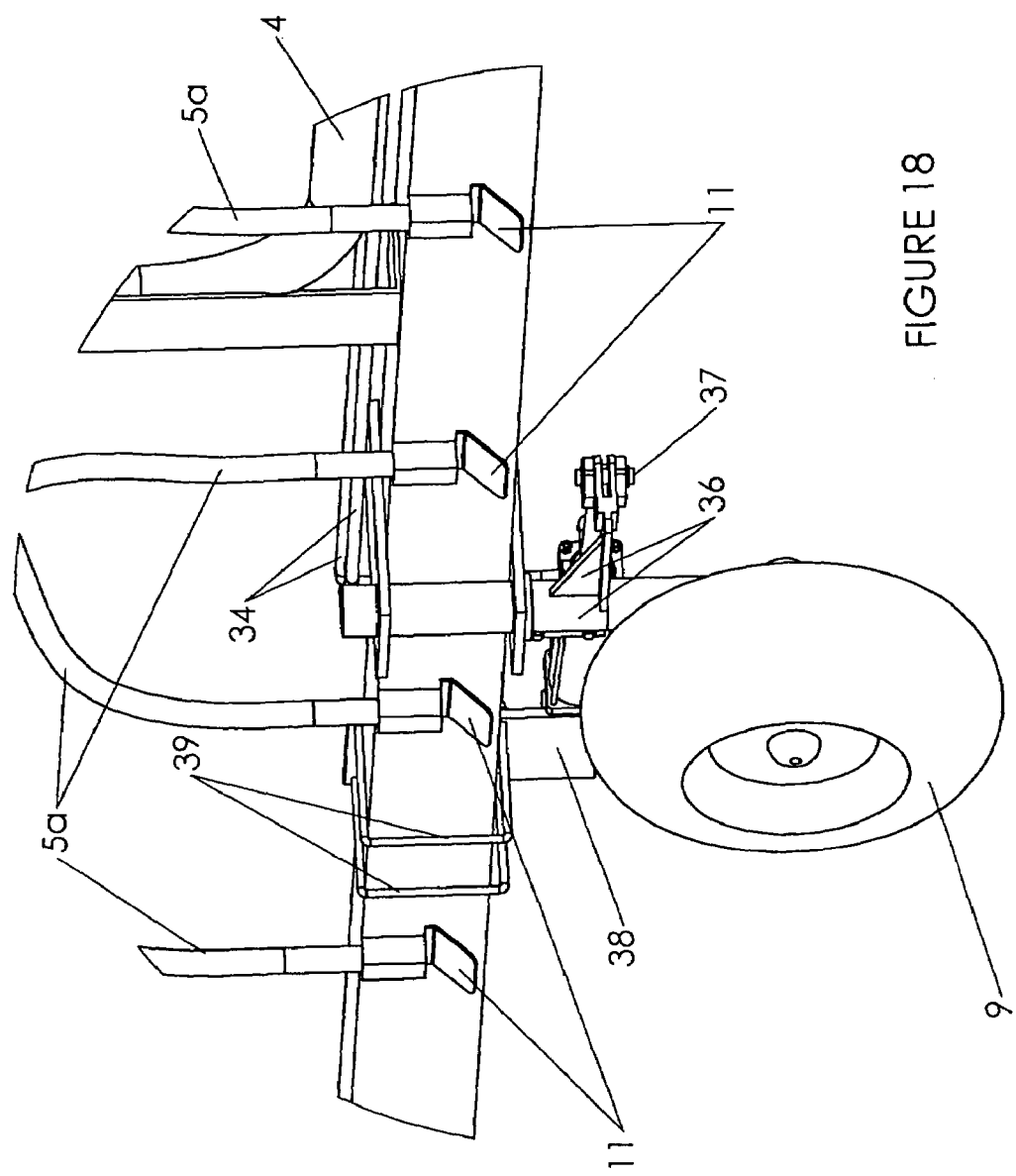

FIG. 18 is a perspective view of the same boom wheel 9 shown in FIG. 17. As shown in this figure, the rear plate 38 is held onto the boom 6 with brackets 39, although the present invention is not limited to any particular method of attaching the rear hydraulic cylinders 35 to the boom 6.

Figure 19:
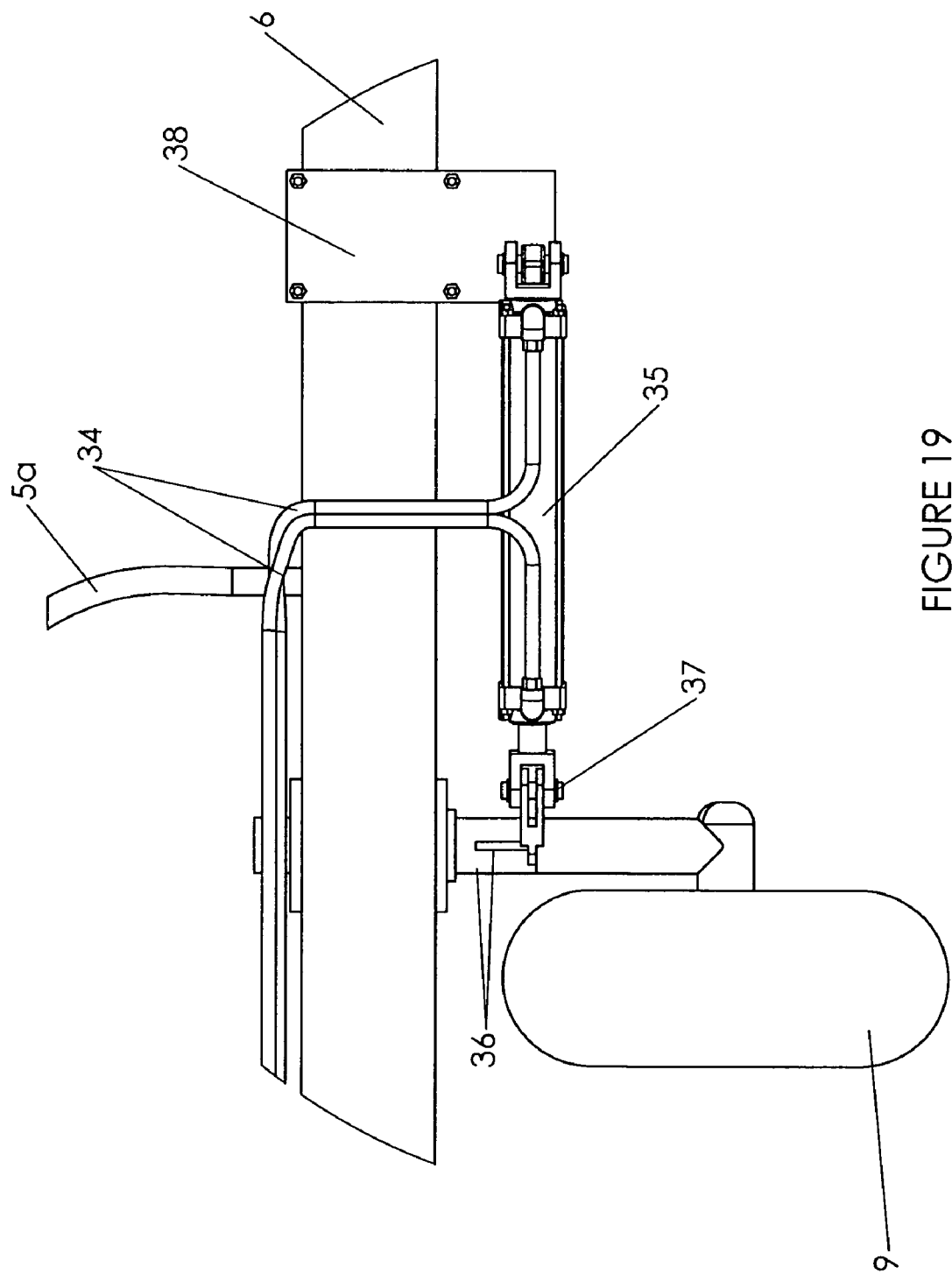
Figure 20:
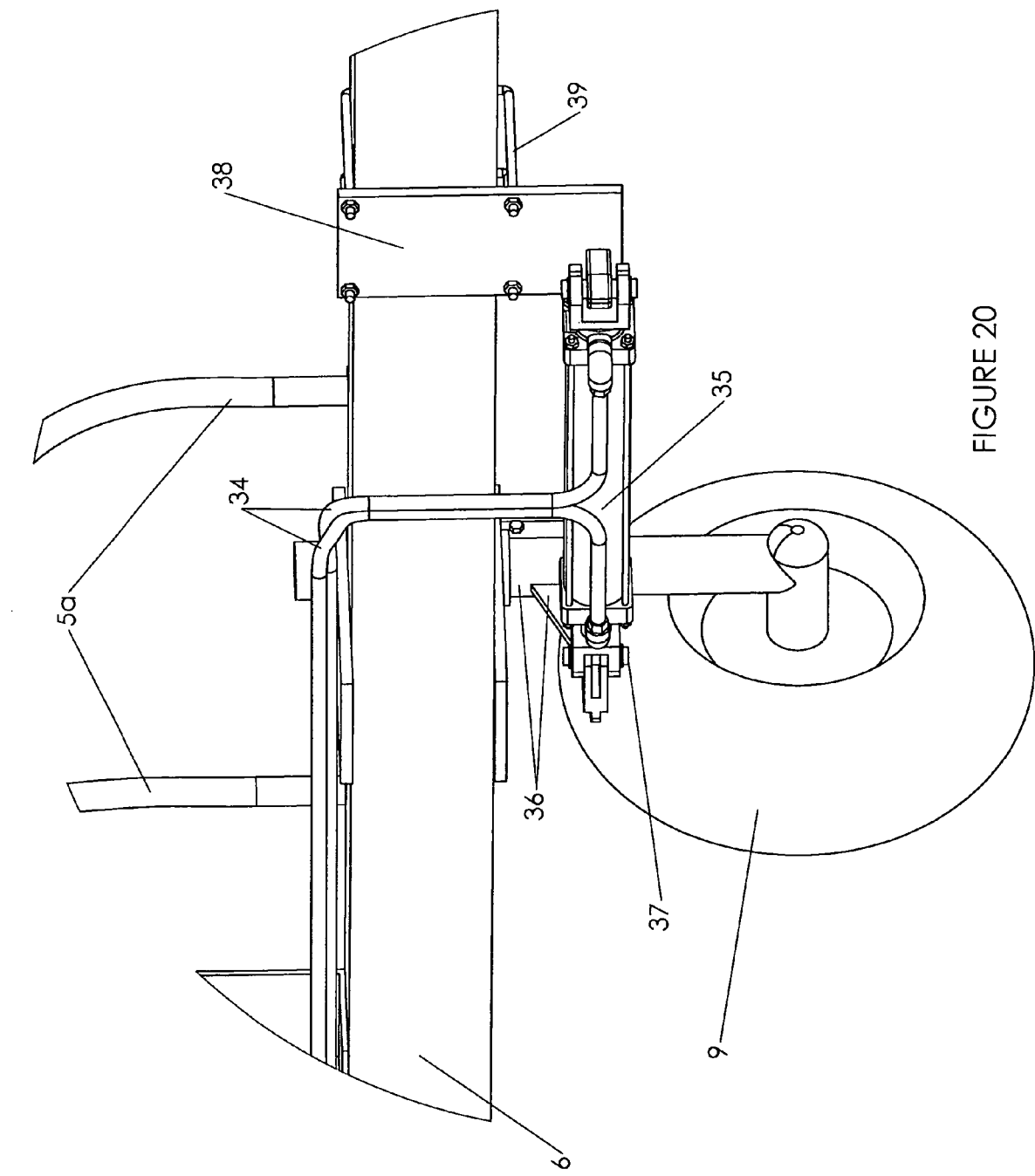

FIG. 19 is a second side view of one of the two rear hydraulic cylinders 35. In this figure, the rear hydraulic cylinder 35 is retracted, which causes the rotating member 36 to be pulled in a counter-clockwise direction (from the perspective of the top view shown in FIG. 5), and the pivot point to be pulled in the direction of the rear plate 38. When the rear hydraulic cylinder 35 is retracted, the boom wheel 9 is also rotated in a counter-clockwise direction so that when the rear hydraulic cylinder 35 is fully retracted, the boom wheel 9 is perpendicular to the boom. FIG. 20 is a perspective view of the same rear hydraulic cylinder 35 shown in FIG. 19.

Figure 21:
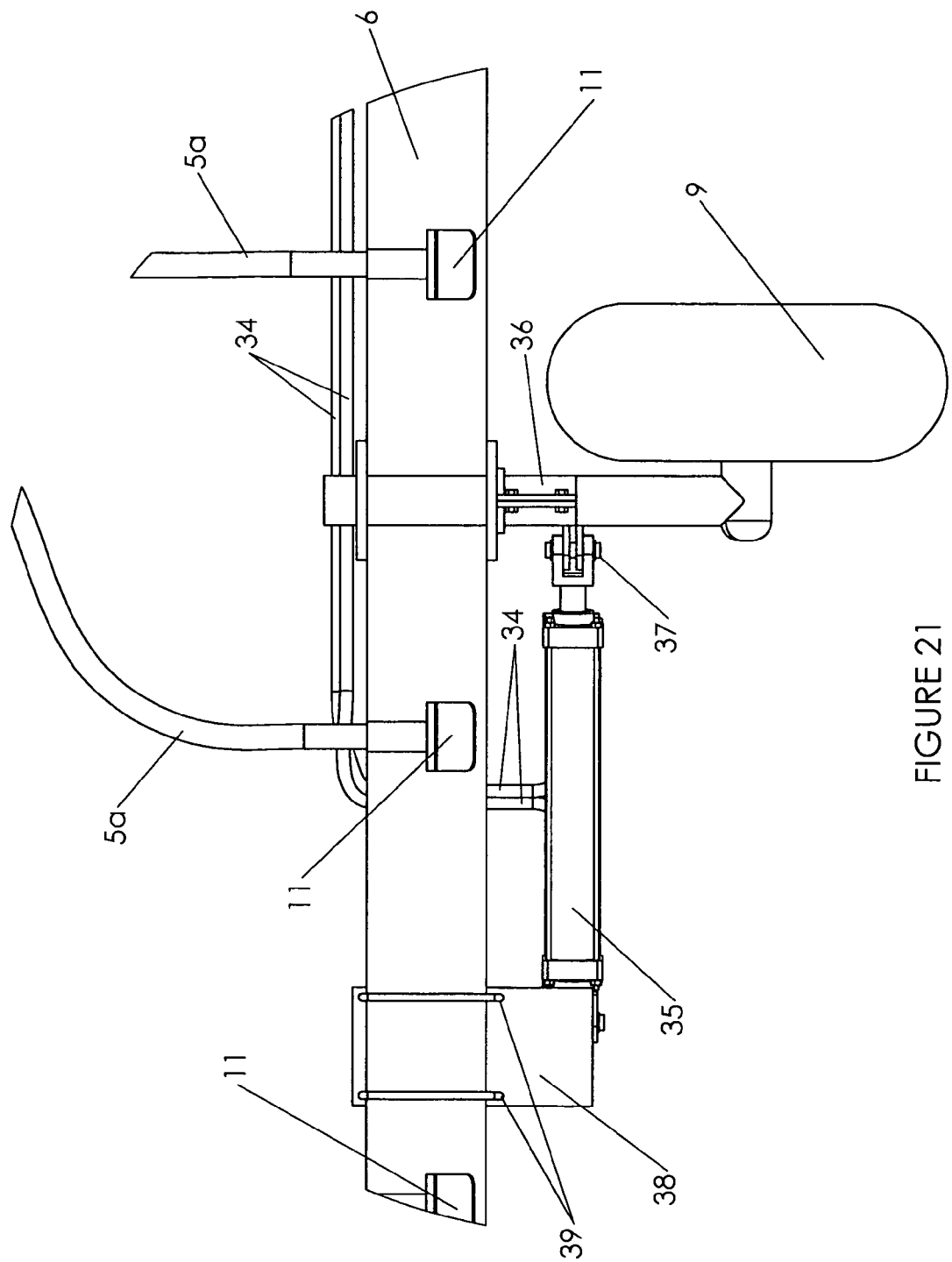
FIG. 21 is a side view of one of the boom wheels with the rear hydraulic cylinder retracted.
Figure 22:
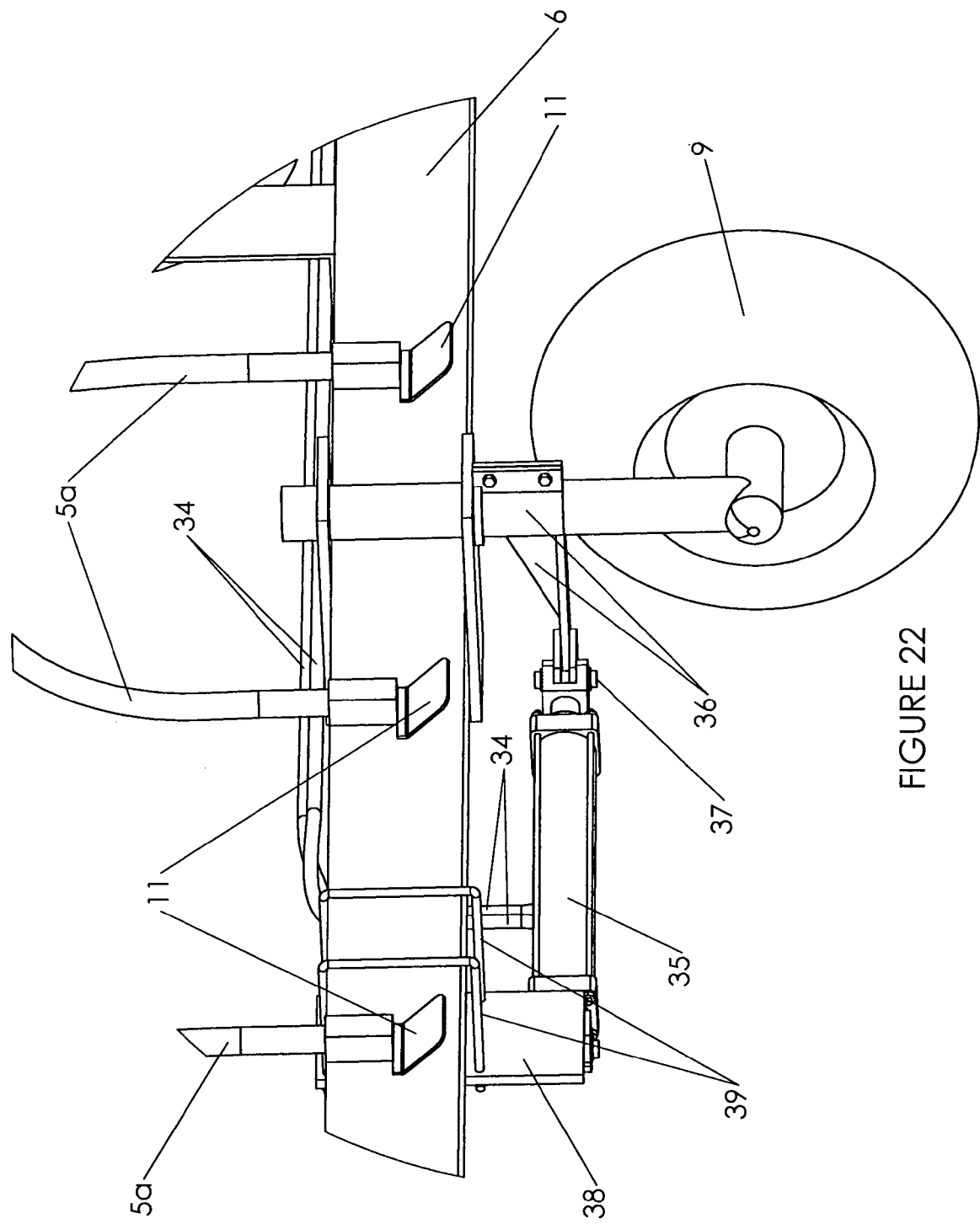
FIG. 22 is a perspective view of the same rear hydraulic cylinder shown in FIG. 21.

FIG. 21 is a side view of one of the boom wheels 9 with the rear hydraulic cylinder 35 retracted. In this figure, the rear hydraulic cylinder 35 and boom wheel 9 are in the same position as in FIG. 19, except that the view is from the opposite side of the boom 6. FIG. 22 is a perspective view of the same rear hydraulic cylinder 35 shown in FIG. 21.

In operation, the alternate embodiment shown in FIGS. 15-22 works as follows. To go from a field position (shown in FIG. 3) to a trail position (shown in FIG. 5), the front hydraulic cylinder 32 is retracted, which causes the swing arm extension 16 to be released from the latching mechanism 17, and the rear hydraulic cylinders 35 are extended, which causes the boom wheels 9 to be turned so that they are parallel with the boom 6. As the boom wheels 9 are being turned parallel with the boom 6, the tractor 3 is driven forward. The forward movement of the tractor, together with the changing position of the boom wheels 9, causes the swing arms 15 to move away from the outside support bars 22 and the main arms 10 and boom 6 to swing into the position shown in FIG. 5.

To go from a trail position to a field position, the front hydraulic cylinder is extended, which causes the rod 19a to extend into the gap 17a in the latching mechanism 17, and the rear hydraulic cylinders 35 are retracted, which causes the boom wheels 9 to be turned so that they are perpendicular to the boom 6. As the boom wheels 9 are being turned, the tractor 3 is driven forward. The forward movement of the tractor, together with the changing position of the boom wheels, causes the swing arms 15 to move toward the outside support bars 22 and the main arms 10 and boom 6 to swing outward. When the boom 6 is approximately two-thirds of the way extended (i.e., somewhere between the position shown in FIG. 5 and the position shown in FIG. 3, but closer to the position shown in FIG. 3), the tractor is either stopped or slowed down. At that point, the forward momentum of the boom 6 causes the swing arms 15 to swing all the way forward until the swing arm extension 16 is inserted into the gap 17a in the latching mechanism 17, where it is held in place by the rod 19a that fits into the notch 16 in the swing arm extension 16. The boom wheels 9 are now fully perpendicular to the boom 6, as shown in FIG. 3.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:
1. A material surface applicator comprising:
   (a) a plurality of receptacles for attaching hoses from an air seeder cart;

(b) a plurality of primary distribution tubes extending from the rear of the receptacles;
(c) a plurality of towers that are mounted on a boom;
(d) a plurality of secondary distribution tubes emanating from each tower;
(e) a plurality of deflector shields mounted to the rear side of the boom;
(f) two boom wheels at either end of the boom;
(g) a center section comprising a single axle, two center wheels, an inside support bar, and two outside support bars;
(h) two swing arms, each of which is pivotally connected to one of the outside support bars of the center section proximate the center wheels;
(i) two main arms, each of which is releasably attached to a swing arm on one end and a bracket on the other end, wherein the bracket is mounted to the boom; and
(j) a latching mechanism that locks the swing arm in place when the dry material surface applicator is in a field or highway position,
further comprising two rear hydraulic cylinders that move the boom wheels so that they are either perpendicular to or parallel with the boom.

2. A material surface applicator comprising:
(a) a plurality of receptacles for attaching hoses from an air seeder cart;
(b) a plurality of primary distribution tubes extending from the rear of the receptacles;
(c) a plurality of towers that are mounted on a boom;
(d) a plurality of secondary distribution tubes emanating from each tower;
(e) a plurality of deflector shields mounted to the rear side of the boom;
(f) two boom wheels at either end of the boom;
(g) a center section comprising a single axle, two center wheels, an inside support bar, and two outside support bars;
(h) two swing arms, each of which is pivotally connected to one of the outside support bars of the center section proximate the center wheels;
(i) two main arms, each of which is releasably attached to a swing arm on one end and a bracket on the other end, wherein the bracket is mounted to the boom; and
(j) a latching mechanism that locks the swing arm in place when the dry material surface applicator is in a field or highway position, further comprising a front hydraulic cylinder, wherein the latching mechanism comprises a rod, and wherein the front cylinder extends and retracts the rod.

3. The material surface applicator of claim 2, wherein when the rod is extended, the swing arm is locked in place in a field position, and wherein when the rod is retracted, the swing arm is released from the latching mechanism.

4. The material surface applicator of claim 2, further comprising two rear hydraulic cylinders, that move the boom wheels so that they are either perpendicular to or parallel with the boom, wherein when the front hydraulic cylinder is retracted, the rear hydraulic cylinders are extended, and wherein when the front hydraulic cylinder is extended, the rear hydraulic cylinders are retracted.

5. The material surface applicator of claim 4, wherein when the rear hydraulic cylinders are extended, the boom wheels are parallel with boom, and when the rear hydraulic cylinders are retracted, the boom wheels are perpendicular to the boom.

* * * * *